(12) United States Patent
Sato et al.

(10) Patent No.: US 12,730,299 B2
(45) Date of Patent: Sep. 8, 2026

(54) ENDOSCOPE

(71) Applicant: HOYA CORPORATION, Tokyo (JP)

(72) Inventors: Rei Sato, Tokyo (JP); Keiichi Saito, Tokyo (JP); Yuki Iida, Saitama (JP)

(73) Assignee: HOYA CORPORATION, Tokyo (JP)

( * ) Notice: Subject to any disclaimer, the term of this patent is extended or adjusted under 35 U.S.C. 154(b) by 288 days.

(21) Appl. No.: 18/290,354

(22) PCT Filed: Jul. 27, 2022

(86) PCT No.: PCT/JP2022/028916
§ 371 (c)(1),
(2) Date: Nov. 13, 2023

(87) PCT Pub. No.: WO2023/017731
PCT Pub. Date: Feb. 16, 2023

(65) Prior Publication Data

US 2024/0255748 A1 Aug. 1, 2024

(30) Foreign Application Priority Data

Aug. 13, 2021 (JP) ................................ 2021-132058

(51) Int. Cl.
*G02B 23/24* (2006.01)

(52) U.S. Cl.
CPC ..... *G02B 23/2461* (2013.01); *G02B 23/2476* (2013.01)

(58) Field of Classification Search
CPC ....................... G02B 23/2461; G02B 23/2476; G02B 7/008; A61B 1/00018; A61B 1/00096; A61B 1/0676; A61B 1/0684; A61B 1/12
See application file for complete search history.

(56) References Cited

U.S. PATENT DOCUMENTS

2010/0217084 A1* 8/2010 Ishigami .............. A61B 1/0684 600/160
2012/0209072 A1 8/2012 Que et al.
(Continued)

FOREIGN PATENT DOCUMENTS

JP 2010-194123 A 9/2010
JP 2011-217969 A 11/2011
(Continued)

OTHER PUBLICATIONS

Office Action issued in Japanese patent application No. 2023-541394, dated Jun. 25, 2024, together with an English translation.
(Continued)

*Primary Examiner* — Mariam Qureshi
(74) *Attorney, Agent, or Firm* — Greenblum & Bernstein, P.L.C.

(57) ABSTRACT

Provided is an endoscope that prevents an increase in temperature of a light-emitting element.
This endoscope includes: an observation window fixed to a distal tip member disposed at a distal tip of an insertion portion; a light-emitting element that emits light in a viewing direction of the observation window; a power supply wire that supplies power to the light-emitting element; an illumination frame that surrounds a connection portion between the light-emitting element and the power supply wire; a connector unit connected to an endoscope processor; and a conductor wire that connects the illumination frame and the connector unit.

9 Claims, 19 Drawing Sheets

(56) References Cited

U.S. PATENT DOCUMENTS

| | | | | |
|---|---|---|---|---|
| 2013/0265798 | A1 | 10/2013 | Kudo | |
| 2021/0338057 | A1* | 11/2021 | Satake | A61B 1/018 |
| 2021/0369087 | A1* | 12/2021 | Kodama | A61B 1/00096 |

FOREIGN PATENT DOCUMENTS

| | | | |
|---|---|---|---|
| JP | 2018-166986 | A | 11/2018 |
| WO | 2012/056851 | A1 | 5/2012 |
| WO | 2013/061838 | A1 | 5/2013 |

OTHER PUBLICATIONS

Search Report issued in European patent application No. 22855794. 8, dated Jul. 11, 2025.

International Search Report issued in International Bureau of WIPO Patent Application No. PCT/JP2022/028916, dated Sep. 8, 2022, along with an English translation thereof.

First Office Action issued in Chinese patent application No. 202280028262.1, dated May 14, 2026, together with an English translation.

* cited by examiner

20

25

60 27 24 22 21

23

ENDOSCOPE

TECHNICAL FIELD

The present invention relates to an endoscope.

BACKGROUND ART

An endoscope including a light-emitting element that is disposed at a distal tip of an insertion portion has been proposed (Patent Literature 1).

CITATION LIST

Patent Literature

Patent Literature 1: WO 2013/061838 A

SUMMARY OF INVENTION

Technical Problem

In a case where the temperature of the light-emitting element rises due to heat generated from the light-emitting element or the like, adverse effects may occur such as a decrease in luminance, a change in emission color, and a reduction in lifetime. In one aspect, an object is to provide an endoscope that prevents an increase in temperature of a light-emitting element.

Solution to Problem

An endoscope includes: an observation window fixed to a distal tip member disposed at a distal tip of an insertion portion; a light-emitting element that emits light in a viewing direction of the observation window; a power supply wire that supplies power to the light-emitting element; an illumination frame that surrounds a connection portion between the light-emitting element and the power supply wire; a connector unit connected to an endoscope processor; and a conductor wire that connects the illumination frame and the connector unit.

Advantageous Effects of Invention

According to one aspect, an endoscope that prevents an increase in temperature of a light-emitting element can be provided.

DESCRIPTION OF EMBODIMENTS

First Embodiment

Figure 1:
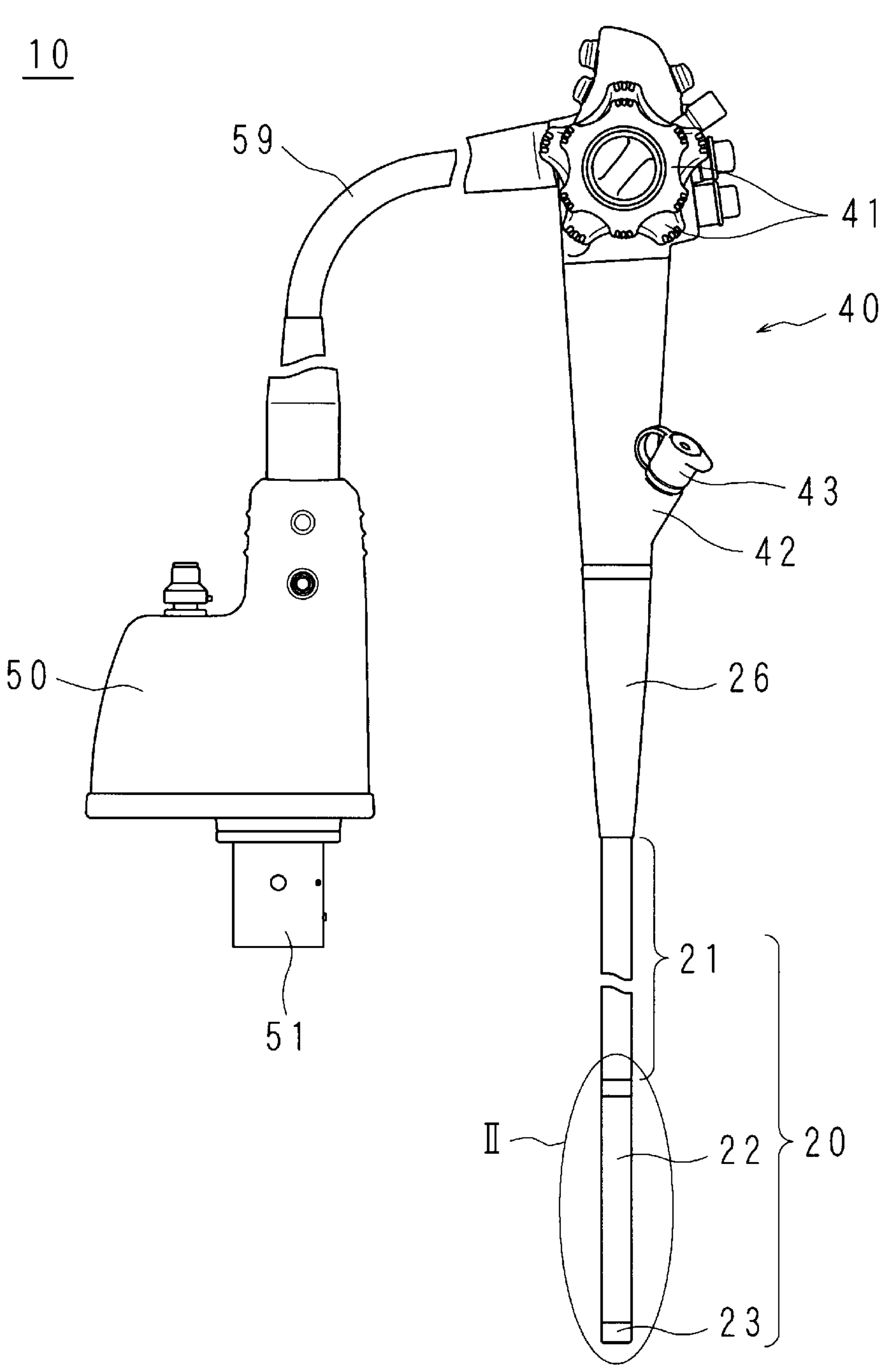
FIG. 1 is an exterior view of an endoscope.

FIG. 1 is an exterior view of an endoscope 10. The endoscope 10 according to the present embodiment is a flexible scope for duodenum. The endoscope 10 includes an insertion portion 20, an operation unit 40, a universal cord 59, and a connector unit 50. The operation unit 40 has a bending knob 41 and a channel inlet 42.

The insertion portion 20 is long and has one end connected to the operation unit 40 via a bend preventing portion 26. The insertion portion 20 includes a soft portion 21, a bending section 22, and a distal tip portion 23 in the order from the operation unit 40 side. The bending section 22 bends in accordance with the operation of the bending knob 41.

A channel penetrating the insertion portion 20 is provided from the channel inlet 42 to the distal tip portion 23. A forceps plug 43 is fixed to the channel inlet 42, the forceps plug 43 having an insertion port through which a treatment instrument or the like is inserted.

In the following description, a longitudinal direction of the insertion portion 20 is referred to as an insertion direction. Similarly, a side close to the operation unit 40 along the insertion direction is referred to as an operation unit side, and a side far from the operation unit 40 is referred to as a distal side.

The universal cord 59 is long, and has a first end connected to the operation unit 40 and a second end connected to the connector unit 50. The connector unit 50 includes an electrical connector 51. The electrical connector 51 is connected to an endoscope processor (not illustrated).

Figures 2, 3:
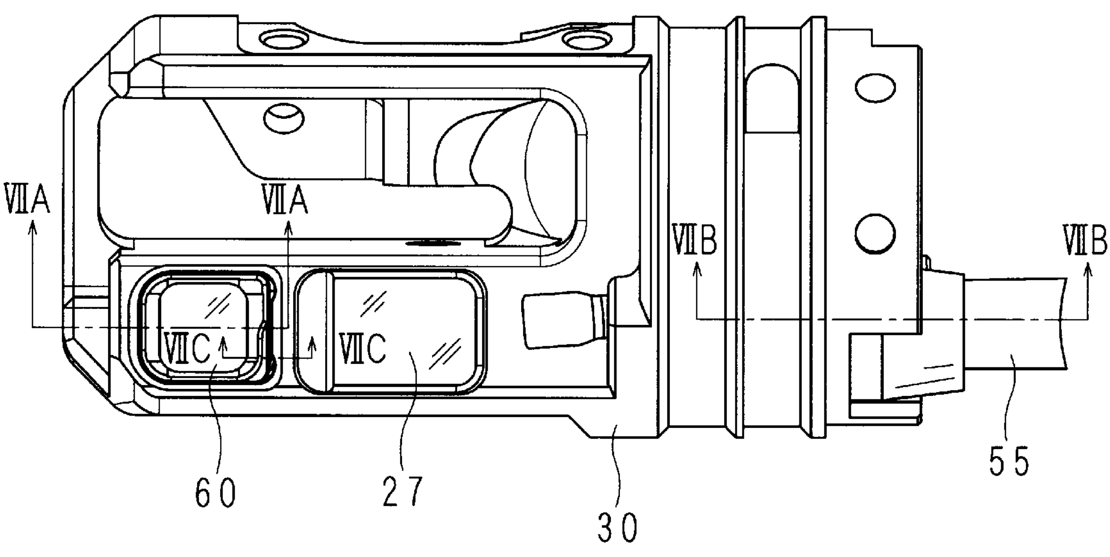
FIG. 2 is an enlarged view of a region II in FIG. 1.
FIG. 3 is an enlarged view of an insertion portion from which an endoscope cap is removed.

FIG. 2 is an enlarged view of a region II in FIG. 1. As illustrated in FIG. 2, an illumination window 60 and an observation window 27 are arranged on a side surface of the distal tip portion 23. The endoscope 10 according to the present embodiment is what is called a side-viewing endoscope in which the viewing direction of the observation window 27 is substantially perpendicular to the insertion direction. An elevator 25 is disposed beside the illumination window 60 and the observation window 27. An endoscope cap 24 that is detachable together with the elevator 25 is attached to the distal tip of the insertion portion 20.

FIG. 3 is an enlarged view of the insertion portion 20 from which the endoscope cap 24 is removed. In FIG. 3, components and the like constituting the bending section 22 are not illustrated, and only main components constituting the distal tip portion 23 are illustrated.

The observation window 27 and the illumination window 60 are fixed to a substantially cylindrical distal tip member 30. The illumination window 60 is located distal to the observation window 27 along the insertion direction. In FIG. 3, the elevator 25 disposed above the illumination window 60 and the observation window 27 is detached from the insertion portion 20 together with the endoscope cap 24.

Figure 4:
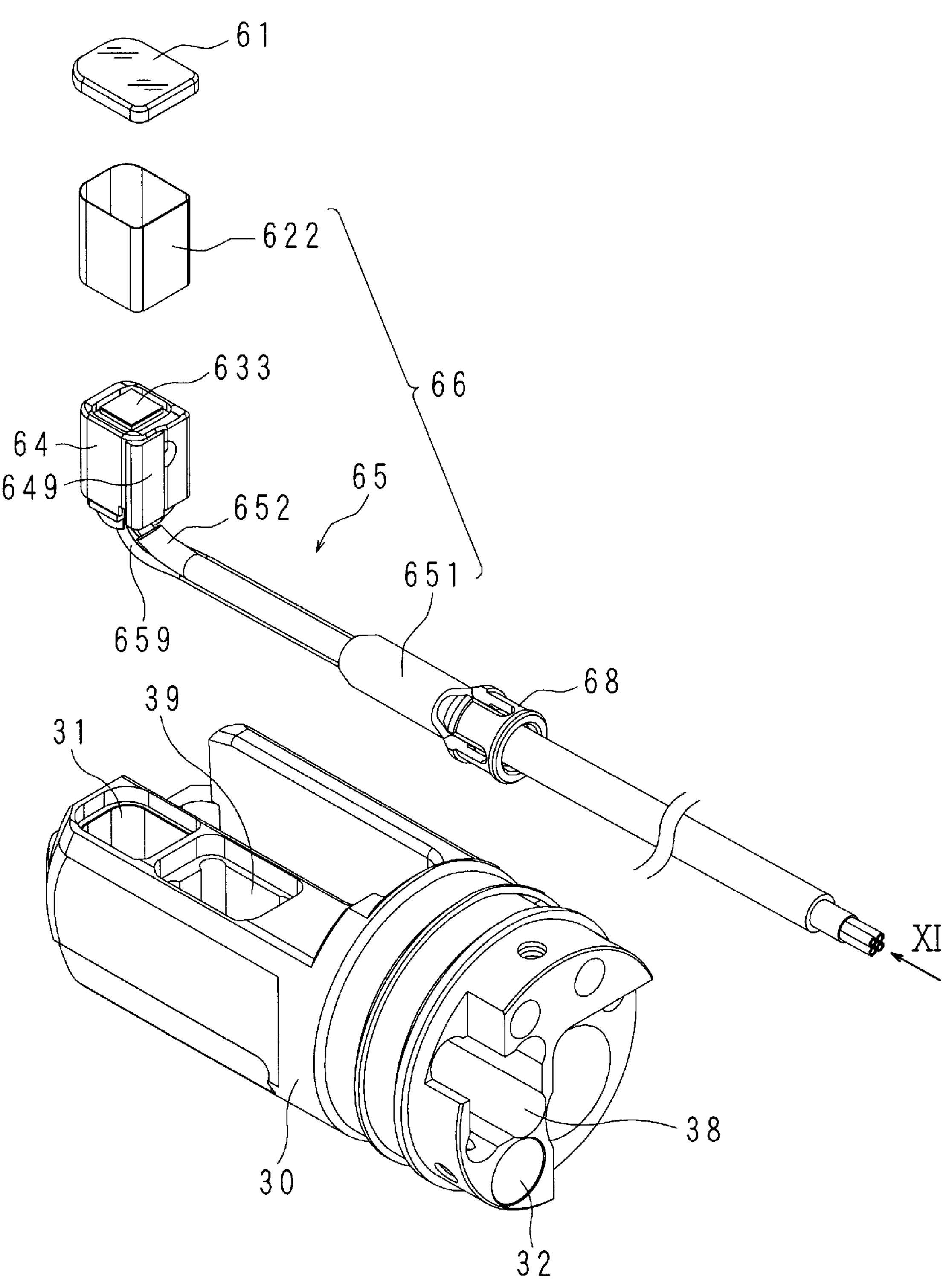
FIG. 4 is an exploded perspective view of an illumination optical system.

FIG. 4 is an exploded perspective view of an illumination optical system. In FIG. 4, components other than the illumination optical system are not illustrated. The illumination optical system includes an illumination unit set 66 and an illumination cover 61. The illumination cover 61 is translucent. The illumination cover 61 is, for example, a thin flat plate having a thickness of about 0.7 mm. An illumination cable 65 is inserted into a cable holding tool 68.

Figure 5:
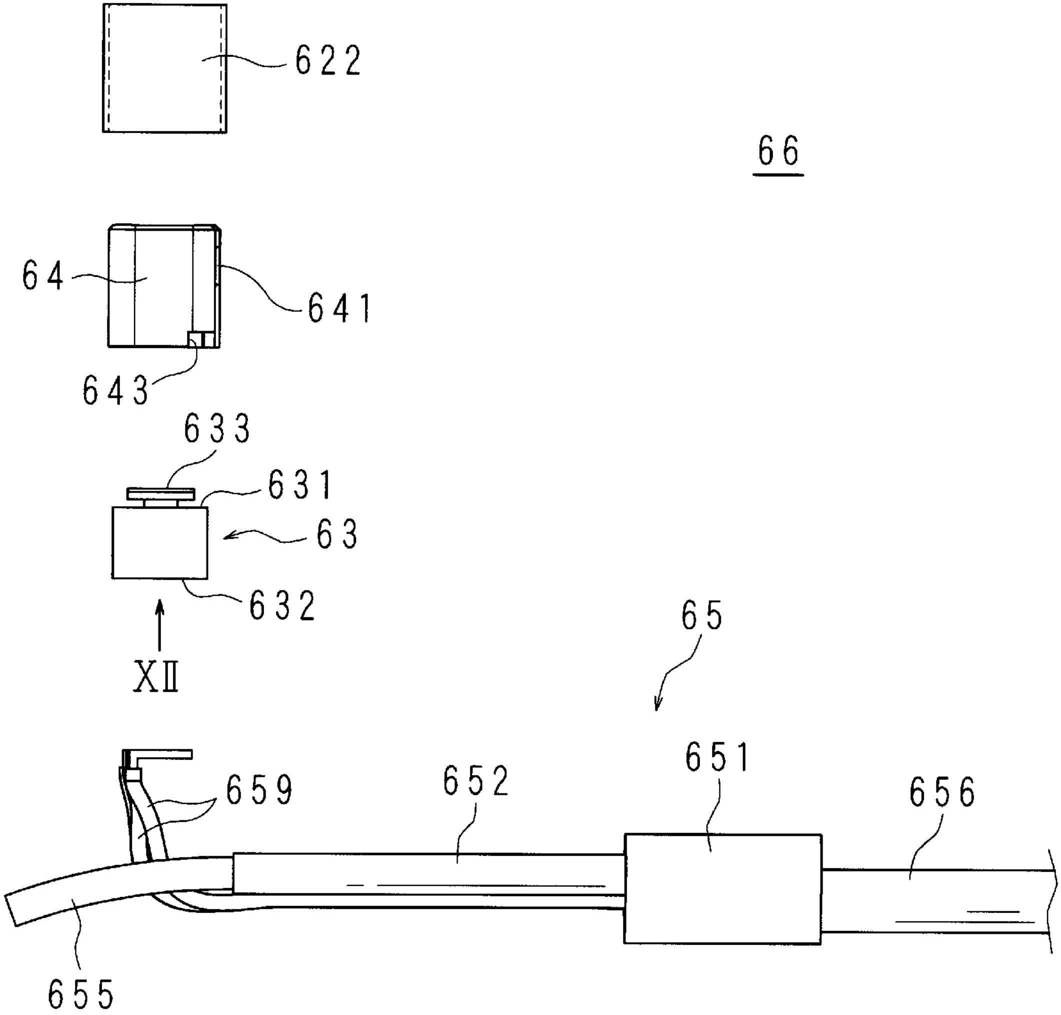
FIG. 5 is an exploded view of an illumination unit set.

FIG. 5 is an exploded view of the illumination unit set 66. The illumination unit set 66 includes the illumination cable 65, a light-emitting element substrate 63 on which the light-emitting element 633 is mounted, the illumination frame 64, and a second insulating sheet 622.

Figure 6:
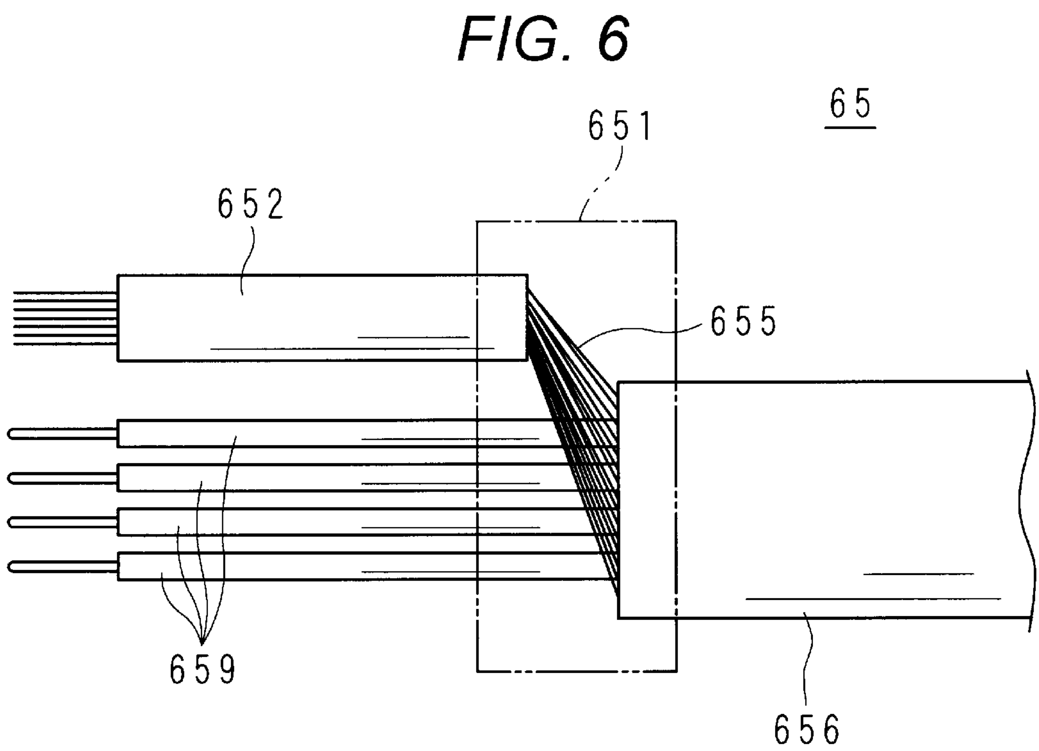
FIG. 6 is an explanatory diagram for describing processing of an illumination cable.

FIG. 6 is an explanatory diagram for describing processing for a terminal of the illumination cable 65. The illumination cable 65 includes four illumination cable core wires 659. Each of the illumination cable core wires 659 is covered with an insulating coating, and the insulating coating is removed only at the end portion. The insulating coating is colored in a different color for each illumination cable core wire 659.

A binder (not illustrated) is wrapped around the outer periphery of the four illumination cable core wires 659. A shield wire 655 including a large number of metal wires is wrapped around the outside of the binder. The metal wire constituting the shield wire 655 is, for example, a copper wire. The outer periphery of the shield wire 655 is covered with an outer sheath 656 made of a soft resin.

At the end portion of the illumination cable 65, the outer sheath 656 is removed to separate the shield wire 655 from the illumination cable core wires 659. The separated shield wire 655 is covered with a second tube 652. A first tube 651 covers the end portion of the outer sheath 656 and the end portion of the second tube 652.

In the present embodiment, the first tube 651 and the second tube 652 are heat shrinkable tubes having insulating properties. As described above, the shield wire 655 is insulated from the illumination cable core wires 659 and the surroundings at a place other than the end portion of the illumination cable 65. The four illumination cable core wires 659 are also insulated from the surroundings at places other than the end portion of the illumination cable 65. In the present embodiment, "insulation" means a state in which electricity is not supplied even when an AC voltage of 500 volts is continuously applied for one minute.

Figure 7:
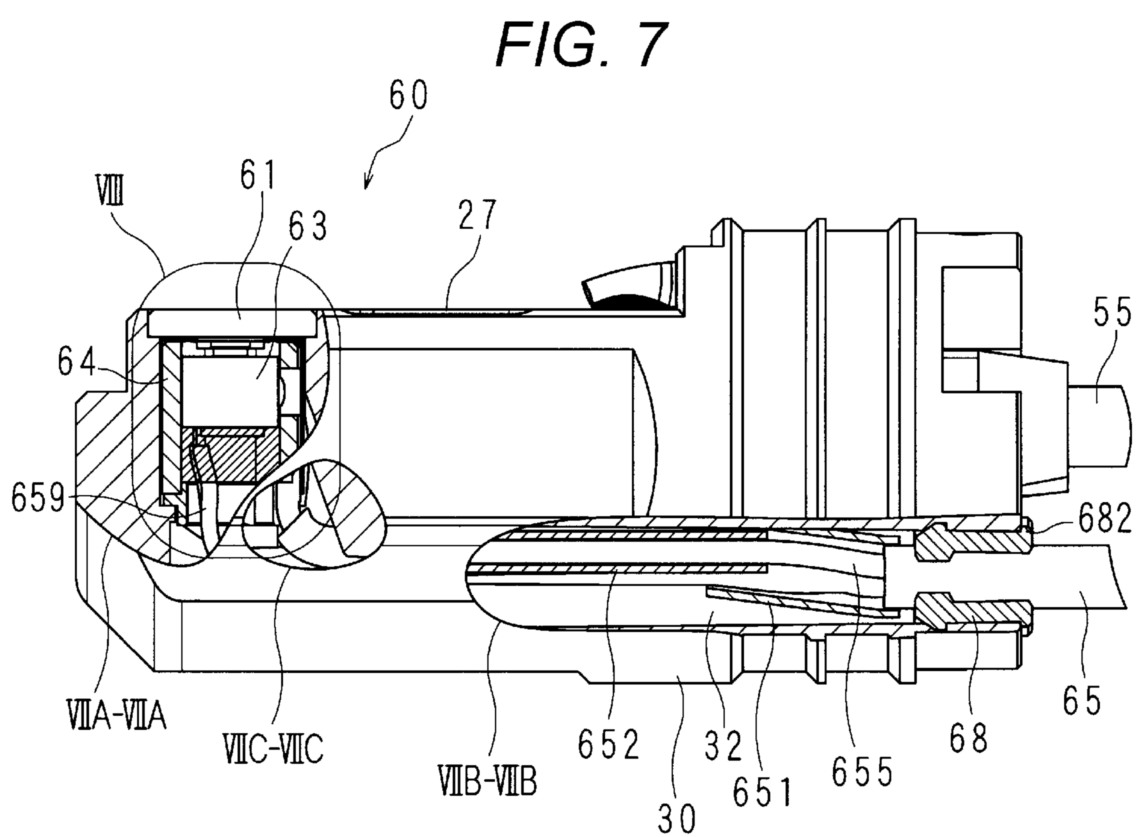
FIG. 7 is a partial cross-sectional view of FIG. 3.
Figure 8:
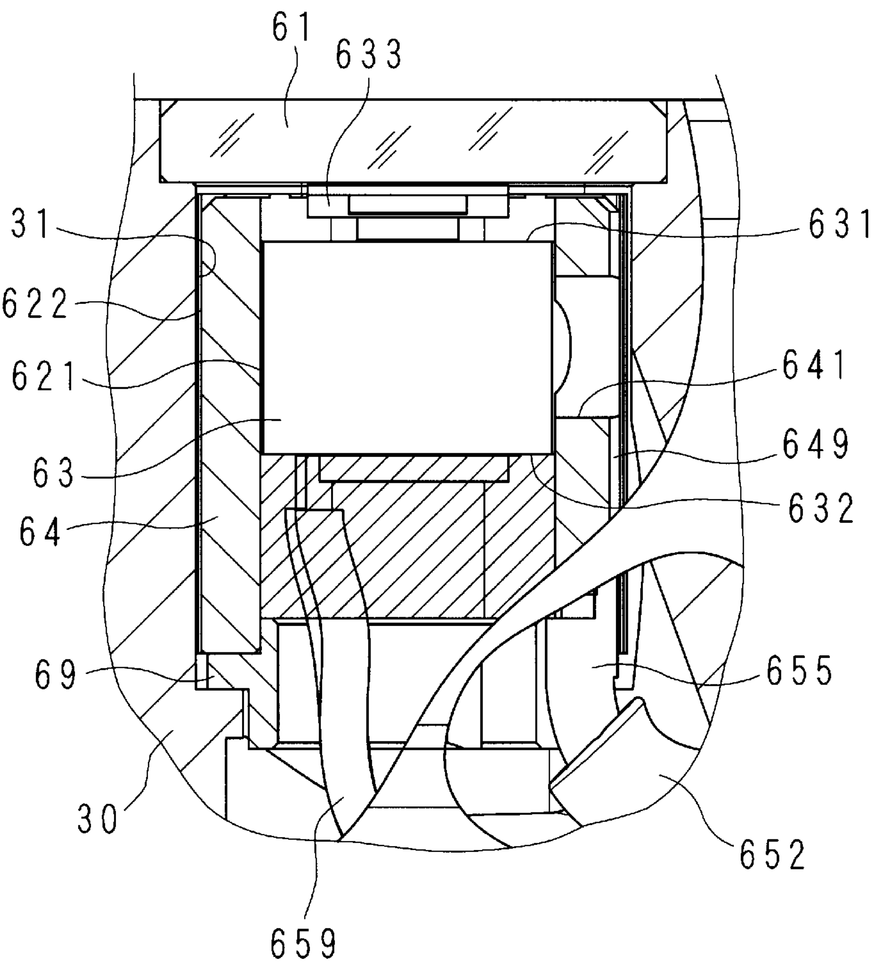
FIG. 8 is an enlarged view of a region VIII in FIG. 7.

FIG. 7 is a partial cross-sectional view of FIG. 3. FIG. 7 includes a cross section along line VIIA-VIIA, a cross section along line VIIB-VIIB, and a cross section along line VIIC-VIIC in FIG. 3. FIG. 8 is an enlarged view of a region VIII in FIG. 7.

A portion appearing in the cross section along line VIIA-VIIA will be described with reference to FIGS. 7 and 8. The illumination cover 61 is fixed to an illumination hole 31 provided on the side surface of the distal tip member 30 in a watertight and airtight manner. The light-emitting element substrate 63 on which the light-emitting element 633 is mounted is disposed at the back of the illumination cover 61.

The light-emitting element substrate 63 has a square plate shape having a first mounting surface 631 and a second mounting surface 632. The light-emitting element substrate 63 has a land such as a copper foil pattern for mounting the light-emitting element 633 on the first mounting surface 631, and has two lands 635 (see FIG. 12) on the second mounting surface 632. The land for mounting the light-emitting element 633 provided on the first mounting surface 631 and the lands 635 provided on the second mounting surface 632 are connected inside the light-emitting element substrate 63.

The four illumination cable core wires 659 are twisted two by two, then bent into a substantially L shape as illustrated in FIG. 5, and mounted on the corresponding lands 635 by soldering or the like. The illumination cable core wires 659 function as a power supply wire that supplies power to the light-emitting element 633. The shield wire 655 is an example of a conductor wire extending along the power supply wire.

The light-emitting element substrate 63 is, for example, a multilayer printed substrate. The light-emitting element substrate 63 is desirably a high heat dissipation substrate such as: a multilayer printed substrate using a high thermal conductive resin; a ceramic substrate such as an alumina substrate or an aluminum nitride base; or a metal base substrate.

A first insulating sheet 621 is attached to a side surface of the light-emitting element substrate 63. The first insulating sheet 621 is, for example, a polyimide tape. Polyimide has high insulation performance, so that it can ensure sufficient insulation only with a thickness of about several tens of micrometers. In FIG. 8, the first insulating sheet 621 is attached to the left side surface of the light-emitting element substrate 63 without being attached to the right side surface. The first insulating sheet 621 may be attached to the entire side surface of the light-emitting element substrate 63.

The side surface of the light-emitting element substrate 63 is surrounded by the cylindrical illumination frame 64 with the first insulating sheet 621 therebetween. The illumination frame 64 has a jig hole 641 which is a circular through hole in a surface on the observation window 27 side. One end face of the illumination frame 64 is substantially flush with the upper surface of the light-emitting element 633. That is, the side of the light-emitting element 633 is surrounded by the illumination frame 64. The other end face of the illumination frame 64 protrudes downward in FIG. 8 from the second mounting surface 632.

The second mounting surface 632 and the protruding portion of the illumination frame 64 form a shape of a downward facing box in FIG. 8. The inside of the box is filled with an insulating resin that covers a mounting portion where the illumination cable core wires 659 are mounted on the second mounting surface 632.

An insulating spacer 69 is disposed between the end portion of the illumination frame 64 and the distal tip member 30. The second insulating sheet 622 is attached to the outer peripheral surface of the illumination frame 64.

The second insulating sheet 622 is, for example, a polyimide tape. Polyimide has high insulation performance, so that it can ensure sufficient insulation only with a thickness of about several tens of micrometers. The second insulating sheet 622 covers the outer periphery of the illumination frame 64. The second insulating sheet 622 may have a portion attached in multiple layers. The second insulating sheet 622 may be formed in a cylindrical shape in advance.

Figure 9:
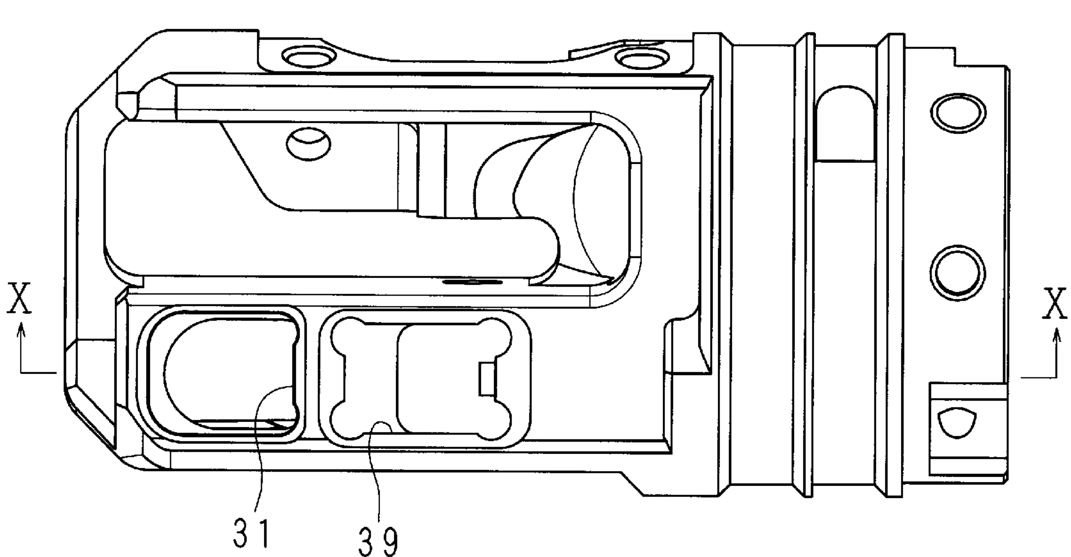
FIG. 9 is a front view of a distal tip member.
Figure 10:
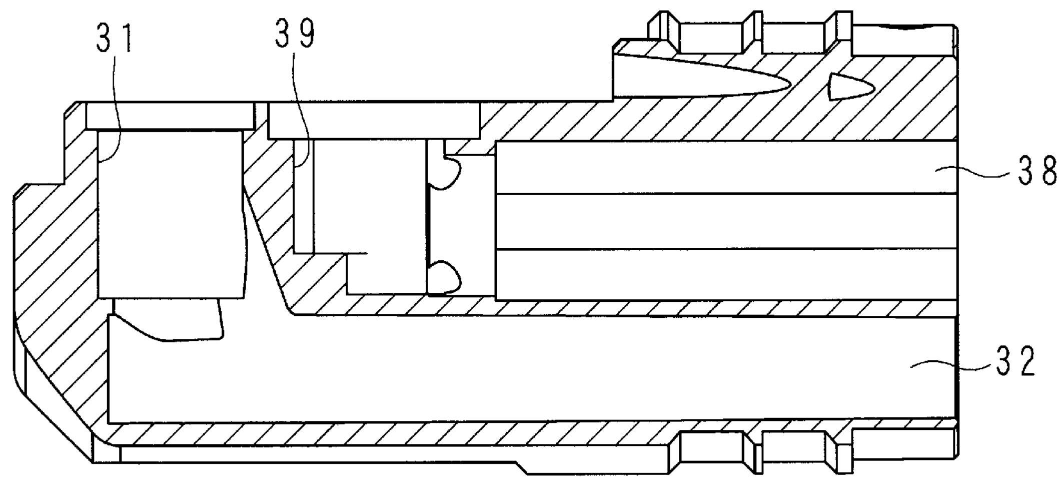
FIG. 10 is a cross-sectional view taken along line X-X in FIG. 9.

FIG. 9 is a front view of the distal tip member 30. FIG. 10 is a cross-sectional view taken along line X-X in FIG. 9. The distal tip member 30 has an observation hole 39 in the side surface in addition to the above-described illumination hole 31. The illumination hole 31 and the observation hole 39 have a substantially rectangular cross section. The edges of the illumination hole 31 and an illumination cable hole 32 are stepped in such a manner that the opening side is wider.

The illumination cable hole 32 communicating with the illumination hole 31 from the end face of the distal tip member 30 on the operation unit side and the observation cable hole 38 communicating with the observation hole 39 are arranged substantially in parallel. As illustrated in FIG. 10, the illumination hole 31 is narrow in front of a connection portion with the illumination cable hole 32 via a step portion. The connection portion between the illumination hole 31 and the illumination cable hole 32 is obliquely widened. The distal tip member 30 is formed of high-strength metal such as stainless steel.

Figure 11:
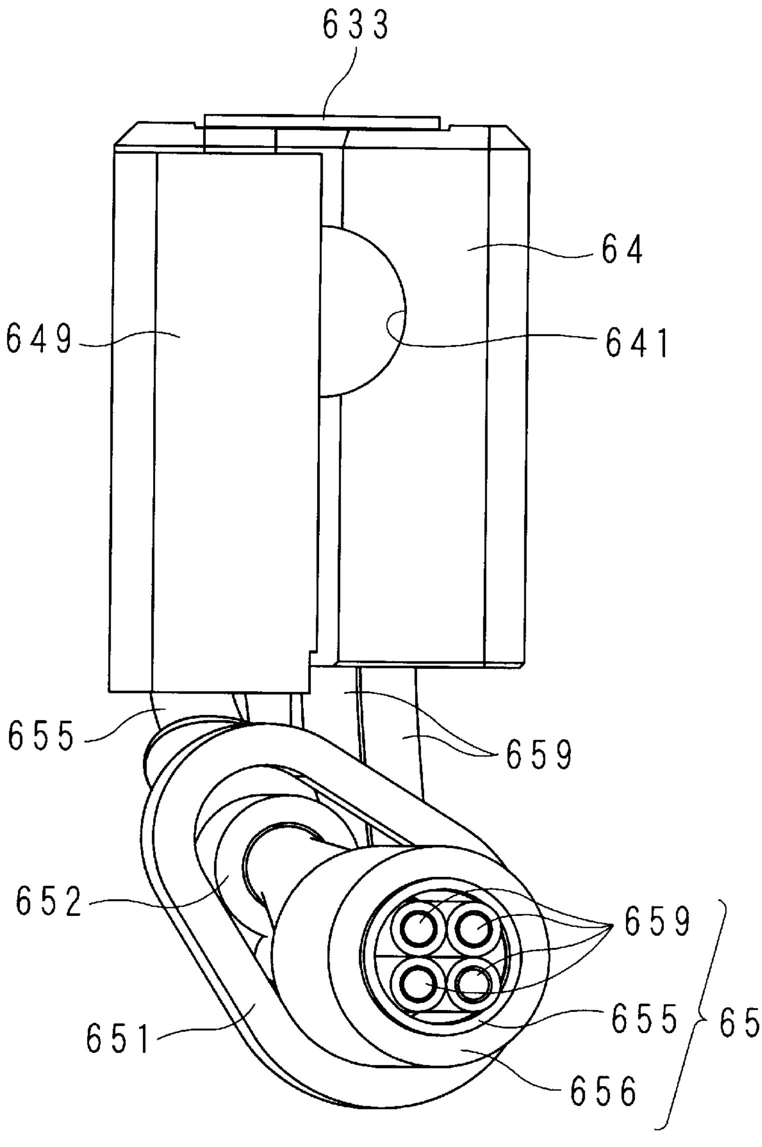
FIG. 11 is a diagram viewed in a direction of an arrow XI in FIG. 4.

FIG. 11 is a diagram viewed in a direction of an arrow XI in FIG. 4. The cable holding tool 68 is not illustrated in FIG. 11. The illumination cable 65 has four illumination cable core wires 659, and thus, has a substantially circular cross section. Therefore, it is possible to prevent the application of loads on other incorporated objects due to twisting or the like occurring inside the insertion portion 20.

Returning to FIG. 7, the description will be continued. A portion appearing in the cross section along line VIIB-VIIB in FIG. 3 will be described. As described above, the illumination cable 65 is fixed to the illumination cable hole 32 by the cable holding tool 68. A large-diameter portion 682 provided at the end portion of the cable holding tool 68 is located outside the illumination cable hole 32 and brought into contact with the distal tip member 30. The details of the structure of the cable holding tool 68 will be described later.

A portion appearing in the cross section along line VIIC-VIIC in FIGS. 7 and 8 will be described. The shield wire 655 exposed from the distal tip of the second tube 652 is connected to the surface of the illumination frame 64 in a state of being formed flat by soldering or the like as illustrated in FIGS. 4 and 11.

Figure 12:
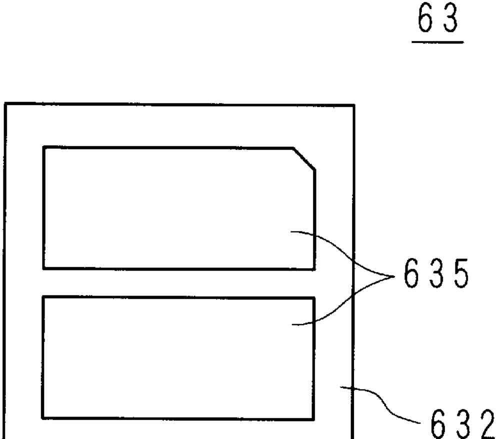
FIG. 12 is a diagram viewed in a direction of an arrow XII in FIG. 5.

FIG. 12 is a diagram viewed in a direction of an arrow XII in FIG. 5. As described above, the two lands 635 are arranged on the second mounting surface 632. The upper land 635 has a shape in which the upper right portion is obliquely cut off. Since the shapes of the two lands 635 are different, the land 635 connected to a positive electrode of the light-emitting element 633 and the land 635 connected to a negative electrode can be easily identified.

The number of the lands 635 is not limited to two. For example, when two types of light-emitting elements 633 for white light and narrowband light are mounted on the first mounting surface 631, lands 635 for the respective light-emitting elements 633 are provided.

Figure 13:
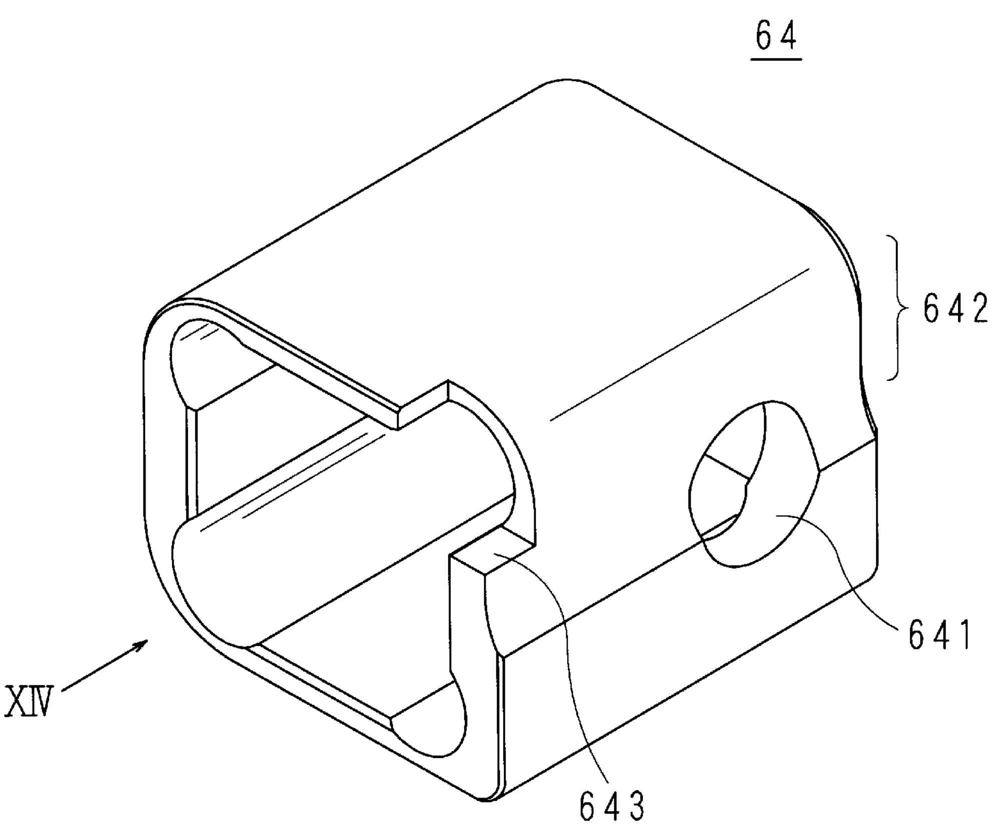
FIG. 13 is a perspective view of an illumination frame.
Figure 14:
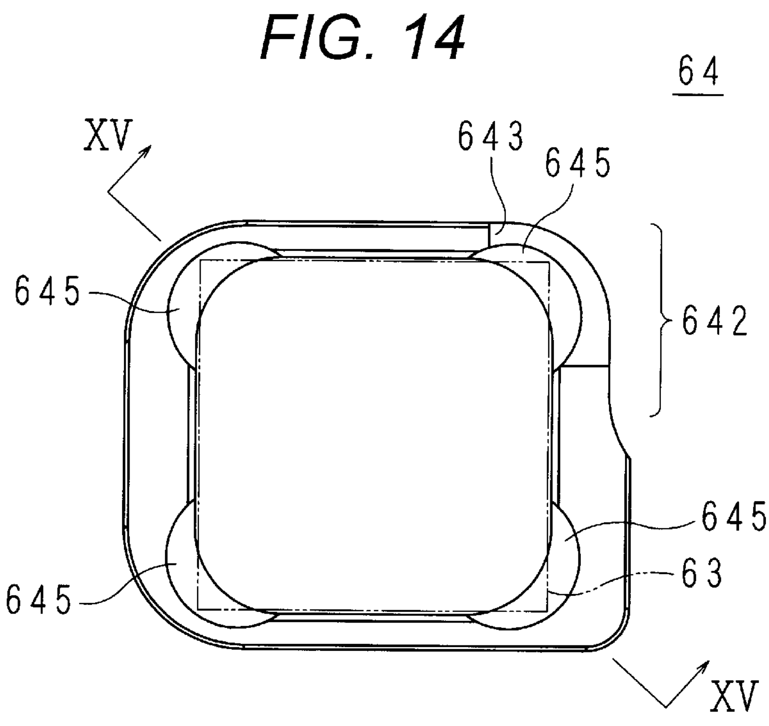
FIG. 14 is a diagram viewed in a direction of an arrow XIV in FIG. 13.
Figure 15:
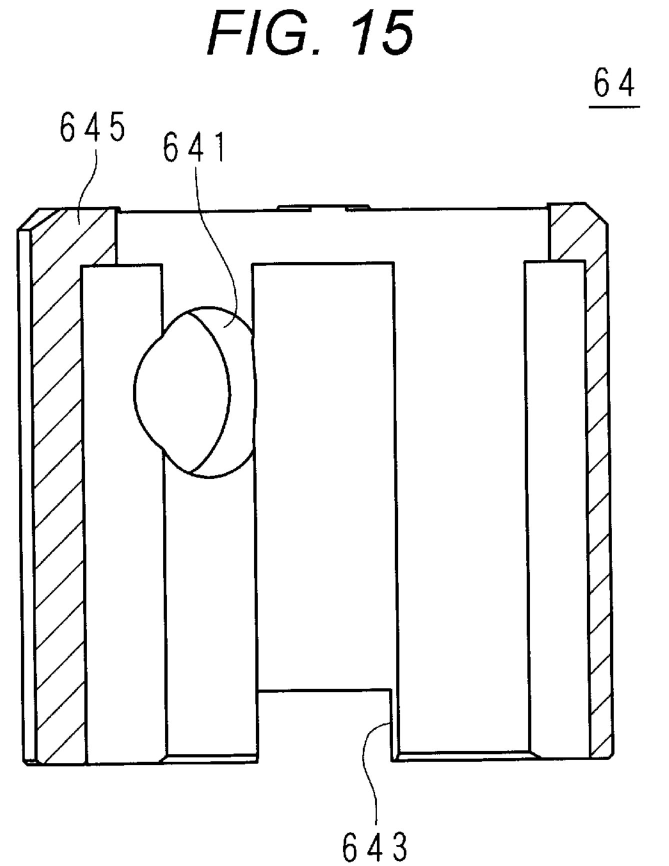
FIG. 15 is a cross-sectional view taken along line XV-XV in FIG. 14.

FIG. 13 is a perspective view of the illumination frame 64. FIG. 14 is a diagram viewed in a direction of an arrow XIV in FIG. 13. FIG. 15 is a cross-sectional view taken along line XV-XV in FIG. 14. The shape of the illumination frame 64 will be described with reference to FIGS. 13 to 15.

The illumination frame 64 has a cylindrical shape with a substantially quadrangular cross section. The outer shape of the cross section is substantially rectangular, and the inner shape of the cross section is substantially square. In FIG. 14, the left and right walls are thicker than the upper and lower walls. The outer surface of the right wall of the illumination frame 64 in FIG. 14 has a stepped shape in which the upper portion is recessed with respect to the lower portion. Therefore, the upper half of the right wall in FIG. 14 is a thin portion 642 having substantially the same thickness as the upper and lower walls. That is, the outer surface of the thin portion 642 is a recess formed along the axial direction of the illumination frame 64. The jig hole 641 is provided at the center of the surface on which the thin portion 642 is provided. A substantially U-shaped illumination frame groove 643 is provided at a corner in contact with the thin portion 642.

Note that the thin portion 642 may not be provided over the entire length along the axial direction of the illumination frame 64. For example, the thin portion 642 may be formed by a recess contiguous to the end face in a portion on the front side of the jig hole 641 in FIG. 13, and the upper portion and the lower portion on the inner side from the jig hole 641 may have the same thickness.

The illumination frame 64 is made of a conductor. The illumination frame 64 is desirably made of metal. The illumination frame 64 is more desirably made of a copper alloy. The illumination frame 64 is still more desirably made of brass. The illumination frame 64 may be made of conductive resin or conductive ceramics. In the following, a case where the illumination frame 64 is made of solderable metal will be described as an example.

As illustrated in FIG. 14, the corner of the inner surface is removed in an arc shape from the end face on the side where the illumination frame groove 643 is provided to the middle. As illustrated in FIG. 15, an abutment portion 645 is provided at an end portion opposite to the side where the illumination frame groove 643 is provided. When the light-emitting element substrate 63 is inserted from the side where the illumination frame groove 643 is provided, the edge of the light-emitting element substrate 63 is brought into contact with the abutment portion 645 as indicated by a dash-dot-dot-dash line in FIG. 14.

As illustrated in FIG. 11, the shield wire 655 is connected to the outside of the thin portion 642 to form a solder connection portion 649. Due to the thin portion 642 being provided, the protrusion of the solder connection portion 649 can be reduced. Therefore, the distal tip member 30 can be downsized. When the shield wire 655 is connected to the illumination frame 64 by soldering, the surface of the illumination frame 64 may be subjected to a surface treatment such as tin plating for improving solderability.

Before soldering or after soldering, the shield wire 655 covered with the second tube 652 may be folded back to the back surface side of the light-emitting element substrate 63 through the portion of the illumination frame groove 643. Due to the illumination frame groove 643, the shield wire 655 can be shaped such that a surplus portion of the shield wire 655 does not interfere with the illumination hole 31.

The four illumination cable core wires 659 may be drawn into the illumination frame 64 through the illumination frame groove 643. Since the illumination frame groove 643 is provided, the illumination frame 64 can be reduced in height. Therefore, the distal tip member 30 can be downsized.

Figure 16:
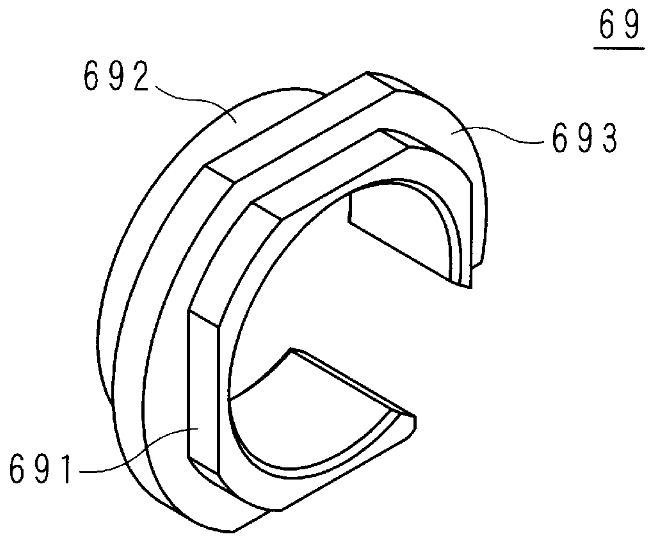
FIG. 16 is a perspective view of a spacer.
Figure 17:
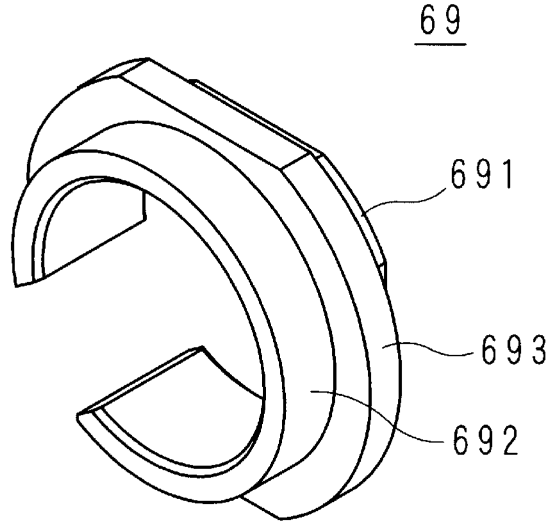
FIG. 17 is a perspective view of the spacer.

FIGS. 16 and 17 are perspective views of the spacer 69. The spacer 69 includes a plate-shaped flange portion 693 having a substantially C shape, a first protrusion 691 protruding from one of both surfaces of the flange portion 693, and a second protrusion 692 protruding from the other surface of the flange portion 693, the first protrusion 691 and the second protrusion 692 having a plate shape with a substantially C shape.

The inner surfaces of the first protrusion 691, the second protrusion 692, and the flange portion 693 form a smooth arcuate curved surface. The first protrusion 691 has flat portions at four positions on the outer surface. As illustrated in FIG. 8, the spacer 69 has a shape in which the first protrusion 691 is fitted into the end portion of the illumination frame 64 and the flange portion 693 are brought into contact with the end portion of the illumination frame 64.

Figure 18:
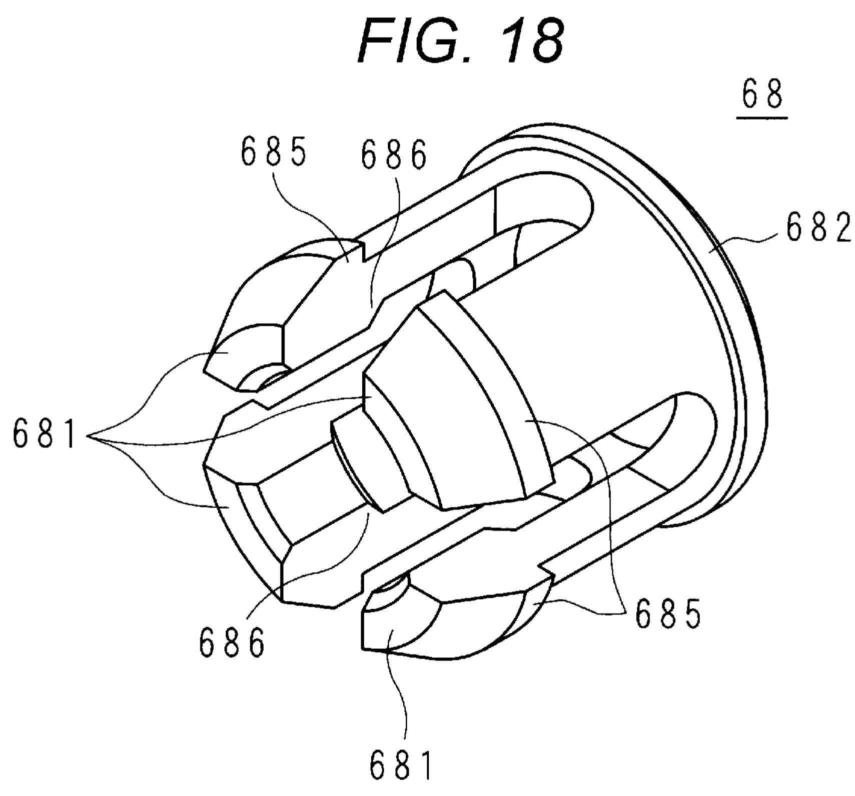
FIG. 18 is a perspective view of a cable holding tool.
Figure 19:
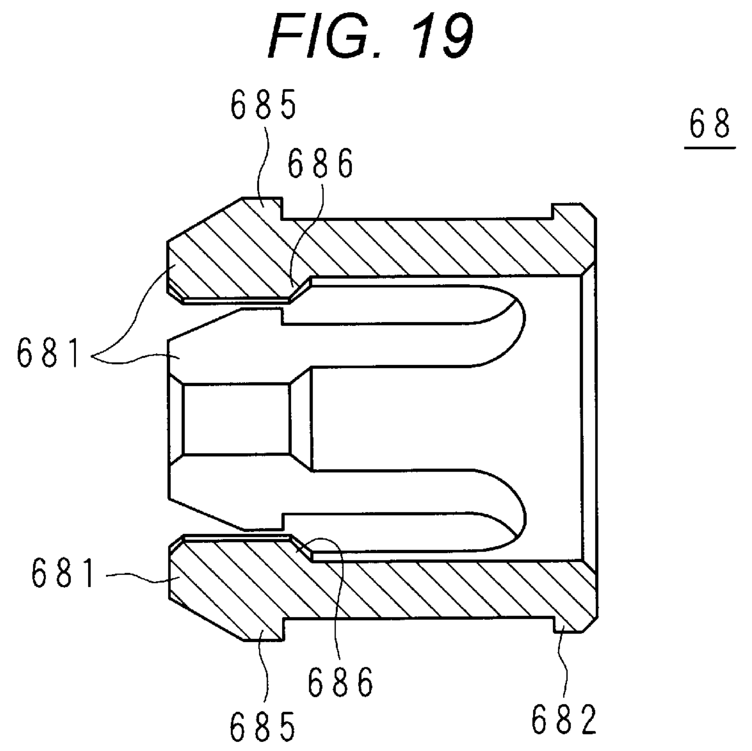
FIG. 19 is a cross-sectional view of the cable holding tool.

FIG. 18 is a perspective view of the cable holding tool 68. FIG. 19 is a cross-sectional view of the cable holding tool 68. The cable holding tool 68 includes an annular large-diameter portion 682 and four cable holding tabs 681 protruding from one surface of the large-diameter portion 682. An outer diameter of the large-diameter portion 682 is larger than an inner diameter of the illumination cable hole 32. Each of the cable holding tabs 681 has an outer surface protrusion 685 on the outer surface and an inner surface protrusion 686 on the inner surface. The end portion of the inner surface protrusion 686 has an obtuse angle.

Note that the number of the cable holding tabs 681 is not limited to four. Any number equal to or greater than two of cable holding tabs 681 may be provided.

Returning back to FIG. 7, the description of the cross section along VIIB-VIIB will be continued. Although not illustrated in FIG. 7, the outer surface protrusions 685 are pressed by the inner surface of the illumination cable hole 32, so that the four cable holding tabs 681 are deformed inward. The inner surface protrusions 686 bite into the outer sheath 656 to firmly hold the illumination cable 65. Since the distal tips of the inner surface protrusions 686 have an obtuse angle, the outer sheath 656 is not broken by the inner surface protrusions 686.

Figure 20:
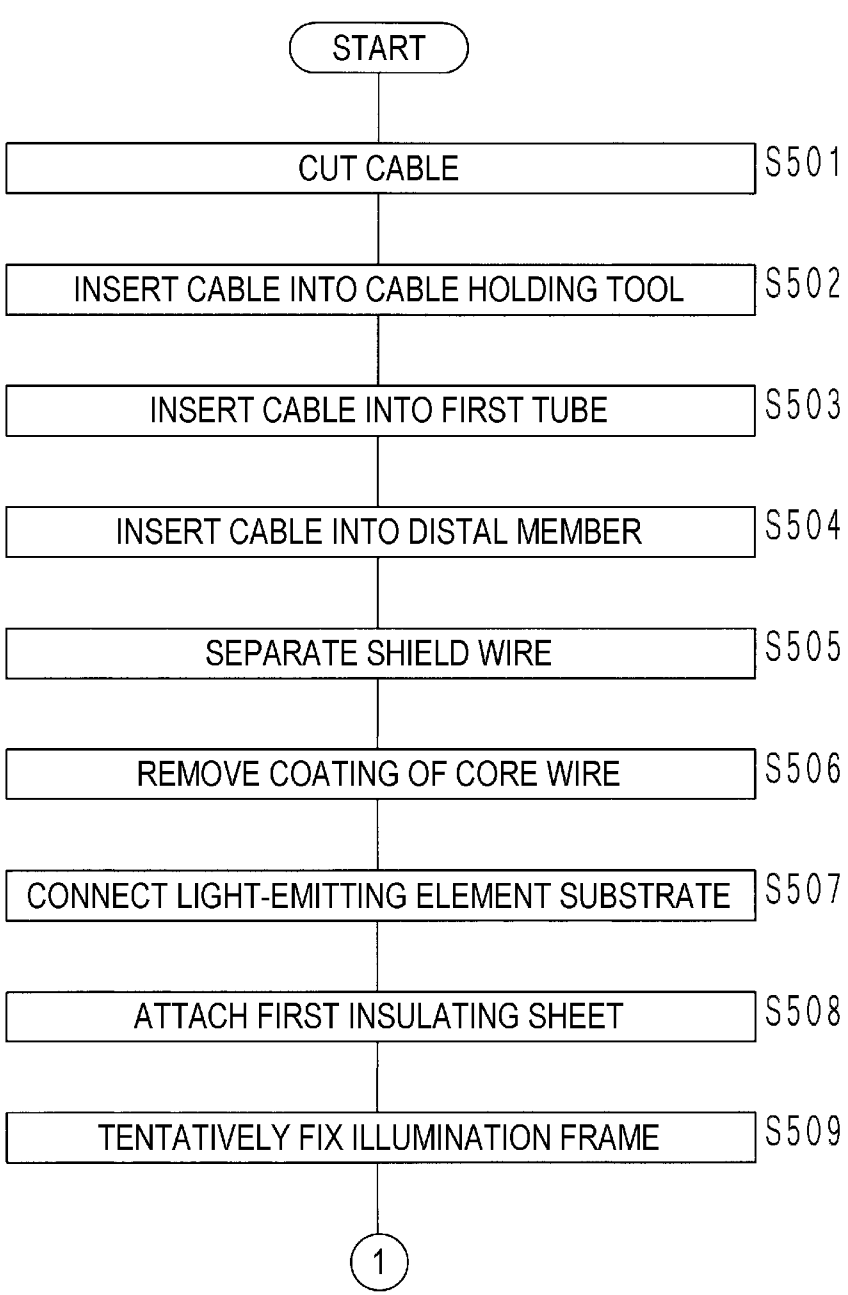
FIG. 20 is an explanatory diagram for describing a procedure of assembly of the illumination optical system.
Figure 21:
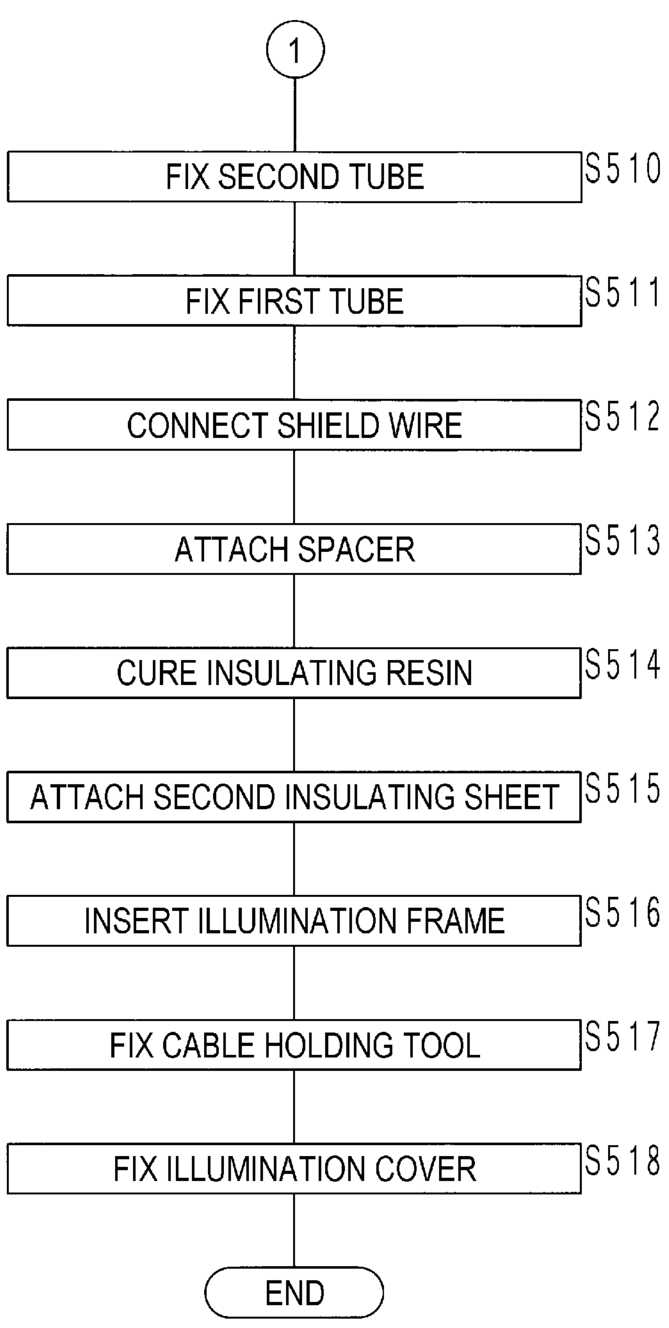
FIG. 21 is an explanatory diagram for describing the procedure of assembly of the illumination optical system.

FIGS. 20 and 21 are explanatory diagrams for describing a procedure of assembly of the illumination optical system. In the following description, a case where a person in charge manually assembles the illumination optical system will be described as an example. Different persons in charge may perform the work for each step. A part or all of the assembling process may be performed by an automatic assembling device such as an assembling robot.

The person in charge cuts the illumination cable 65 supplied in the form of a reel roll or the like to a predetermined length (step S501). The predetermined length is, for example, slightly longer than the length from the distal tip portion 23 to the connector unit 50 via the operation unit 40 and the universal cord 59. The predetermined length may be about the length from the distal tip portion 23 to the operation unit 40.

The person in charge inserts the end portion of the cut illumination cable 65 into the cable holding tool 68 (step S502). In the following description, processing on the end portion of the illumination cable 65 on the side the cable holding tabs 681 face will be described.

The person in charge inserts the end portion of the illumination cable 65 into the first tube 651 (step S503). The person in charge inserts the end portion of the illumination cable 65 into the distal tip member 30 through the illumination cable hole 32 and protrudes the end portion of the illumination cable 65 from the illumination hole 31 (step S504). As described above, the connection portion between the illumination hole 31 and the illumination cable hole 32 is obliquely widened, whereby the person in charge can easily protrude the end portion of the illumination cable 65 from the illumination hole 31.

The person in charge removes the outer sheath 656 having a predetermined length and the binder (not illustrated) to separate the illumination cable core wires 659 from the shield wire 655 (step S505). The predetermined length is about several centimeters. The person in charge cuts and removes a filler (not illustrated) at a position as close as possible to the end portion of the outer sheath 656. The person in charge twists the shield wires 655 into one wire.

The person in charge removes the coating of each of the four illumination cable core wires 659 by a predetermined length (step S506). The predetermined length is about several millimeters. The person in charge twists the portions of the illumination cable core wires 659 from which the coating has been removed two by two. The combination of the illumination cable core wires 659 to be twisted is determined by the color of the coating.

The person in charge forms the twisted illumination cable core wires 659 into a substantially L-shape as illustrated in FIG. 5, and pre-coats the illumination cable core wires with solder. The person in charge connects the two sets of illumination cable core wires 659 to the lands 635 of the light-emitting element substrate 63, respectively (step S507). Which set is connected to which land 635 is determined by the color of the coating. In this manner, the illumination cable core wires 659 are mounted on the lands 635.

The person in charge attaches the first insulating sheet 621 to the side surface of the light-emitting element substrate 63 (step S508). The person in charge may attach the first insulating sheet 621 only when determining that a gap between the light-emitting element substrate 63 and the illumination frame 64 is large after covering the light-emitting element substrate 63 with the illumination frame 64. The person in charge may repeat attaching the first insulating sheet 621 and checking the gap with the illumination frame 64 until the light-emitting element substrate 63 is just fitted in the illumination frame 64.

When covering the light-emitting element substrate 63 with the illumination frame 64, the person in charge orients the surface provided with the jig hole 641 in the direction in which the illumination cable core wires 659 are drawn out as illustrated in FIG. 11.

In a case where the light-emitting element substrate 63 and the illumination frame 64 can be manufactured with high accuracy, it is desirable that the dimension is set such that the light-emitting element substrate 63 is just fit in the illumination frame 64 in a state where the first insulating sheet 621 is wrapped once around the side surface of the light-emitting element substrate 63. In a case where the distance between the side surface of the light-emitting element substrate 63 and the internal electrode of the light-emitting element substrate 63 can be sufficiently ensured, the dimension may be set such that the light-emitting element substrate 63 is just fit in the illumination frame 64 in a state where the first insulating sheet 621 is not attached.

The person in charge inserts the light-emitting element substrate 63 inside the illumination frame 64. The person in charge temporarily fixes the light-emitting element substrate 63 and the illumination frame 64 in a state where the first mounting surface 631 is brought into contact with the abutment portion 645 (step S509). For the temporary fixing, an adhesive that cures in a short time such as a cyanoacrylate adhesive, for example, is used. When an adhesive having low viscosity is used for temporary fixing, the person in charge may drop the adhesive from the jig hole 641. The dropped adhesive is cured while spreading between the light-emitting element substrate 63 and the inner surface of the illumination frame 64 due to a capillary phenomenon. In step S509, firm adhesion using an epoxy adhesive or the like may be performed.

The person in charge inserts the twisted shield wires 655 into the second tube 652 cut into a predetermined length. The shield wires 655 are exposed several millimeters from the distal tip of the second tube 652. The person in charge applies heat to the second tube 652 to contract the second tube 652, thereby fixing the shield wires 655 and the second tube 652 (step S510).

The person in charge adjusts the position of the first tube 651 so that the first tube 651 covers the end portion of the outer sheath 656 and the end portion of the second tube 652. The person in charge applies heat to the first tube 651 to contract the first tube 651, thereby fixing the outer sheath 656, the second tube 652, and the first tube 651 (step S511).

The person in charge flattens the distal tip of the shield wire 655 and pre-coats the distal tip with solder. The person in charge connects the shield wire 655 to the thin portion 642 of the illumination frame 64 by soldering (step S512). In the following description, a portion where the shield wire 655 and the illumination frame 64 are connected by soldering is referred to as solder connection portion 649.

The solder connection portion 649 includes metal wires forming the shield wire 655 and solder connecting the metal wires to each other. As illustrated in FIG. 11, it is desirable that the surface of the solder connection portion 649 is formed flat. The person in charge may shape the surface of the solder connection portion 649 using, for example, a file or the like.

The person in charge attaches the spacer 69 to the illumination frame 64 (step S513). Specifically, the person in charge aligns the directions of the opening of the spacer 69 and the illumination frame groove 643, and with this state, inserts the first protrusion 691 of the spacer 69 into the illumination frame 64. The person in charge pushes the first protrusion 691 until the first protrusion 691 comes in contact with the end face of the illumination frame 64, and temporarily fixes the spacer 69 and the illumination frame 64. For the temporary fixing, an adhesive that cures in a short time such as a cyanoacrylate adhesive, for example, is used.

The person in charge holds the illumination frame 64 with the spacer 69 facing upward. The person in charge injects and cures an insulating resin into a box defined by the second mounting surface 632 and the light-emitting element substrate 63 (step S514). The mounting portion where the illumination cable core wires 659 are soldered is protected by the insulating resin. At the same time, the light-emitting element substrate 63, the illumination frame 64, and the spacer 69 are firmly bonded to each other by the insulating resin.

The person in charge attaches the second insulating sheet 622 to the outer periphery of the illumination frame 64 (step S515). After applying the adhesive to the surface of the second insulating sheet 622, the person in charge inserts the illumination frame 64 into the illumination hole 31 (step S516). After wiping off the excess adhesive, the person in charge cures the adhesive under predetermined curing conditions.

The person in charge pushes and fixes the cable holding tool 68 into the illumination cable hole 32 (step S517). The cable holding tool 68 is fixed inside the illumination cable hole 32 by elasticity. A recess for holding the tabs of the cable holding tool 68 may be provided on the inner surface of the illumination cable hole 32. The person in charge may adhesively fix the cable holding tool 68 and the illumination cable hole 32.

The person in charge adhesively fixes the illumination cover 61 to the end portion of the illumination hole 31 (step S518). At this time, the person in charge sufficiently spreads the adhesive between the edge of the illumination cover 61 and the inner surface of the illumination hole 31 to bond the illumination cover 61 and the illumination hole 31 in a watertight manner. In this manner, the illumination optical system fixed to the distal tip member 30 is completed.

The other end side of the illumination cable 65 is connected to the electrical connector 51 of the connector unit 50. Note that the illumination cable 65 may be connected to the electrical connector 51 via another cable connected inside the operation unit 40.

Most of a power supply path of the light-emitting element 633 such as the illumination cable core wires 659 is covered with the shield wire 655 and the illumination frame 64 electrically connected to the shield wire 655. The shield wire 655 is connected to a signal ground (GND) of the endoscope processor, that is, a GND of a patient circuit, via the electrical connector 51.

The distal tip member 30 is electrically connected to a metal member provided in the operation unit 40 and the connector unit 50 via a bending mechanism inside the bending section 22 and a metal member in the flexible tube constituting the exterior of the soft portion 21. These metal members are capacitively connected to a housing of the endoscope processor, that is, a frame GND, via a capacitor provided inside the connector unit 50 or the like. Since a structure for connecting a metal member constituting the endoscope 10 to the frame GND is conventionally used, the detailed description thereof will be omitted.

The shield wire 655 and the light-emitting element 633 are insulated by the first insulating sheet 621, the insulating resin covering the connection portion between the illumination cable core wires 659 and the light-emitting element substrate 63, the second tube 652, the coating of the illumination cable core wires 659, and the like. The shield wire 655 is insulated from the metal portion constituting the distal tip member 30 and the endoscope 10 by the second insulating sheet 622, the second tube 652, the outer sheath 656, and the like. In the power supply circuit of the light-emitting element 633, the GND side is connected to a GND potential or the like of the patient circuit via the electrical connector 51.

The light-emitting element 633 and the metal member constituting the endoscope 10 are insulated by the insulating resin covering the connection portion between the illumination cable core wires 659 and the light-emitting element substrate 63, the spacer 69, the coating of the illumination cable core wires 659, and the like.

That is, in the endoscope 10 according to the present embodiment, the light-emitting element 633, the metal member constituting the endoscope 10, and the shield wire 655 are insulated from each other in a portion other than the connector unit 50. With such an insulating structure, electrical safety required for medical electric equipment is ensured.

The outline of the usage of the endoscope 10 into which the illumination optical system is incorporated according to the embodiment will be described. Power is supplied from the endoscope processor to the light-emitting element 633 via the illumination cable 65. The light-emitting element 633 emits light with luminance corresponding to the supplied current of the power supply to emit light in the viewing direction of the observation window 27. The emission luminance of the light-emitting element 633 is adjusted by, for example, an automatic dimming function of the endoscope processor. The emission luminance may be adjusted on the basis of an operation of a user such as a doctor.

A patient, a doctor, an instrument disposed around the distal tip portion 23 of the endoscope 10, or the like may be charged by static electricity, and may cause discharge with the distal tip portion 23. If a current due to the discharge passes through the light-emitting element 633, the light-emitting element 633 may be damaged.

However, in the endoscope 10 according to the present embodiment, the light-emitting element 633 is surrounded by the illumination frame 64 which is a conductor except for the light-emitting surface. A conductive path connected from the illumination frame 64 to the connector unit 50 via the shield wire 655 serves as a lightning rod, whereby it is possible to reduce the possibility that the light-emitting element 633 is damaged by the current due to the discharge.

Heat generated in the light-emitting element 633 will be described. When a sheet having a thickness of about several tens of micrometers is used as the first insulating sheet 621 and the second insulating sheet 622, heat generated in the light-emitting element 633 passes through these sheets by thermal conduction and reaches the illumination frame 64.

Therefore, the heat generated in the light-emitting element 633 is diffused into the insertion portion 20 while being conducted to the operation unit side via both the illumination cable core wires 659 and the shield wire 655. That is, the shield wire 655 functions as a heat conduction wire.

That is, in addition to the illumination cable 65 that supplies power to the light-emitting element 633, the illumination frame 64 and the shield wire 655 also serve as a heat dissipation path that dissipates heat generated by the light-emitting element 633. An increase in temperature of the light-emitting element 633 can be reduced by both heat dissipation paths.

The present embodiment can provide the endoscope 10 which is hardly damaged by static electricity. The present embodiment can provide the endoscope 10 capable of preventing an increase in temperature of the light-emitting element 633.

The illumination cable core wires 659 are twisted two by two at the distal tip, and thus, the endoscope 10 can be provided that does not interfere with an endoscopic examination even if one illumination cable core wire 659 is broken.

By using metal such as stainless steel for the distal tip member 30, a reduction in diameter and a reduction in distal rigid length can be achieved in, for example, the endoscope 10 having a complicated structure in the distal tip portion 23 such as a duodenum endoscope having a forceps elevating function.

A method of connecting the shield wire 655 and the illumination frame 64 is not limited to soldering. The shield wire 655 and the illumination frame 64 may be connected by, for example, brazing, ultrasonic welding, or a conductive adhesive.

The endoscope 10 is not limited to the side-viewing type. The endoscope 10 may be a so-called direct-viewing type provided with the observation window 27 and the illumination window 60 on an end face of the distal tip portion 23. The endoscope 10 may be of a so-called oblique-viewing type including the observation window 27 and the illumination window 60 that are obliquely provided with respect to the insertion direction.

First Modification

Figure 22:
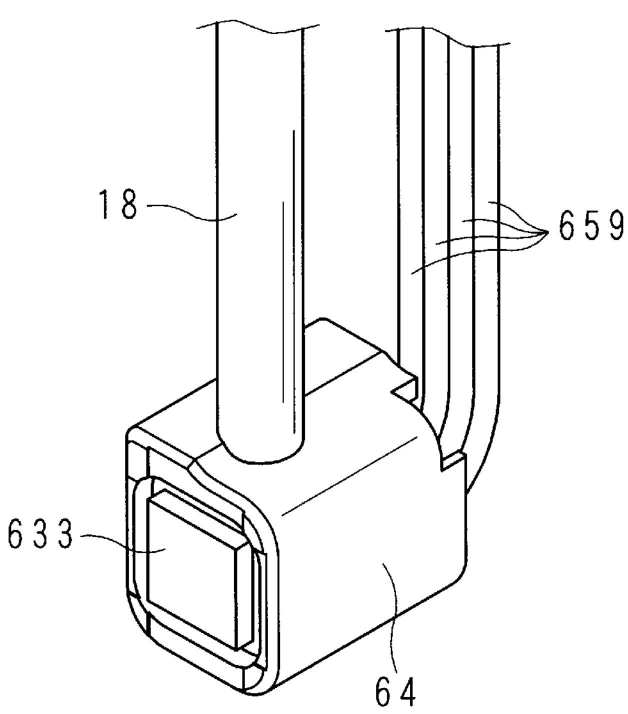
FIG. 22 is an explanatory diagram for describing a modification of a step of fixing the illumination frame and a light-emitting element substrate.

FIG. 22 is an explanatory diagram for describing a modification of a step of fixing the illumination frame 64 and the light-emitting element substrate 63. The step illustrated in FIG. 22 is a modification of step S509 described with reference to FIG. 20.

The person in charge applies a small amount of adhesive to the surface of the inner surface of the illumination frame 64 opposite to the surface provided with the jig hole 641, and then inserts the light-emitting element substrate 63 into the illumination frame 64. The person in charge may apply a small amount of adhesive to the side surface of the light-emitting element substrate 63 instead of the inner surface of the illumination frame 64.

After bringing the first mounting surface 631 into contact with the abutment portion 645, the person in charge inserts a cylindrical jig 18 into the jig hole 641 as illustrated in FIG. 22 to press the light-emitting element substrate 63, thereby pressing the light-emitting element substrate against the inner surface of the illumination frame 64. The person in charge cures the adhesive while continuing pressing.

The jig 18 is not limited to have a cylindrical shape. The jig 18 may include a mechanism for pressing the illumination frame 64. The jig 18 may include a mechanism that sets the pressing force to an appropriate strength.

According to the present modification, it is possible to provide the endoscope 10 that prevents a variation in the direction of the illumination light emitted from the light-emitting element 633 due to a deviation in the positional relationship between the light-emitting element substrate 63 and the illumination frame 64 at the time of temporary fixing.

Second Modification

The present modification relates to an endoscope 10 in which the illumination cable 65 does not include the shield wire 655. The descriptions of portions common to those of the first embodiment will be omitted.

The illumination cable 65 includes one conductor wire in addition to the four illumination cable core wires 659 described with reference to FIG. 6. The conductor wire is covered with an insulating coating. A binder is wrapped around the outer periphery of the four illumination cable core wires 659 and the conductor wire. The binder is covered with an outer sheath 656 made of a soft resin.

At the end portion of the illumination cable 65, the outer sheath 656 is removed to separate the conductor wire from the illumination cable core wires 659. The insulating coating at the distal tip of the conductor wire is removed, and the conductor wire is connected to the illumination frame 64. According to the present modification, the step of attaching the second tube 652 and the first tube 651 can be eliminated.

Note that the conductor wire may not be covered with the insulating coating. In such a case, it is desirable to attach the second tube 652 and the first tube 651 after removal of the outer sheath 656 to insulate portions other than a portion connected to the illumination frame 64.

Second Embodiment

Figure 23:
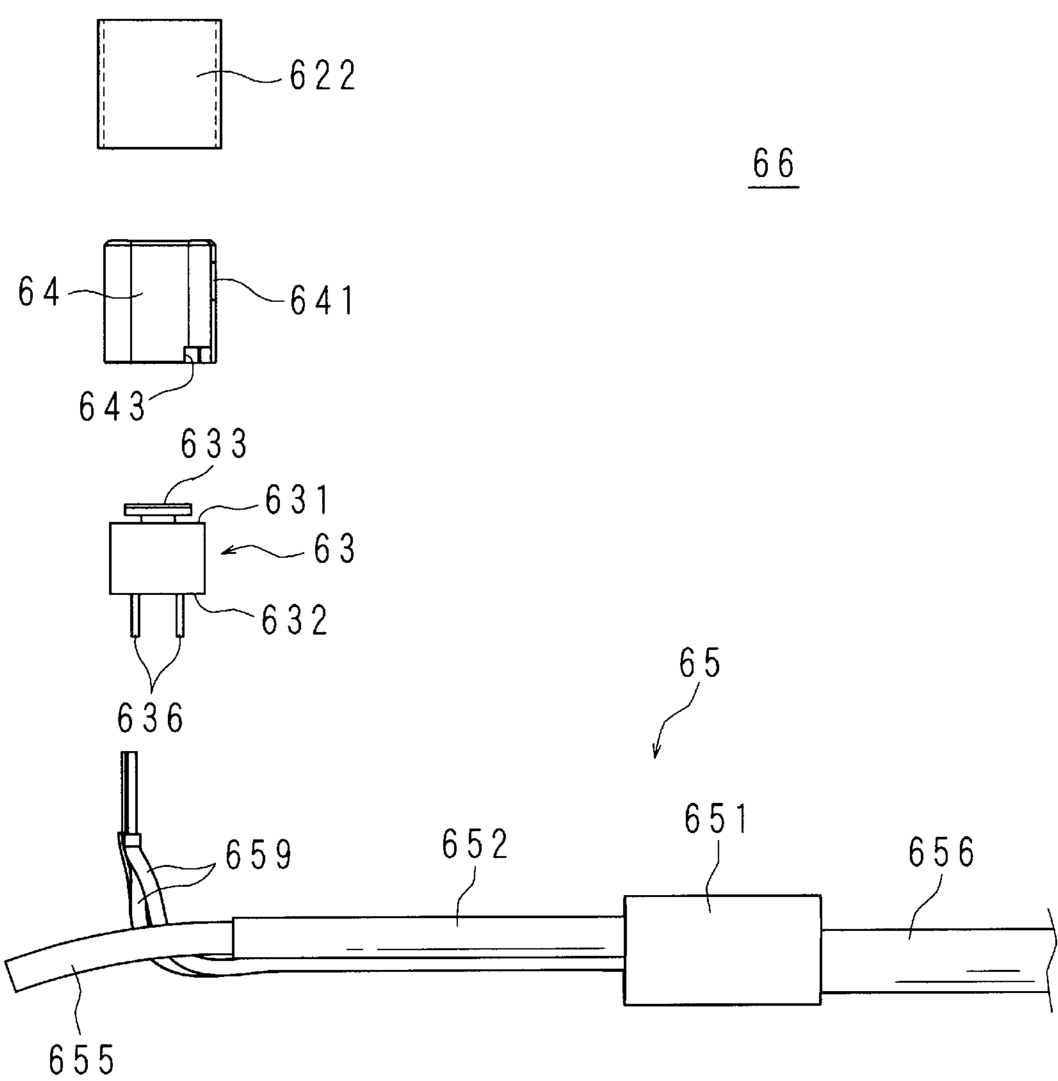
FIG. 23 is an exploded view of an illumination unit set according to a second embodiment.
Figure 24:
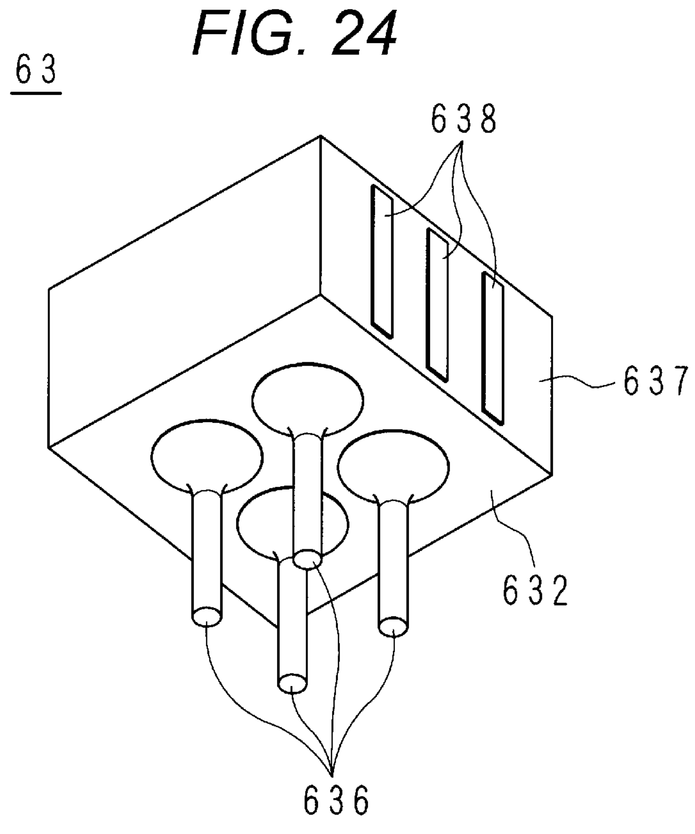
FIG. 24 is a perspective view of a light-emitting element substrate according to the second embodiment.
Figure 25:
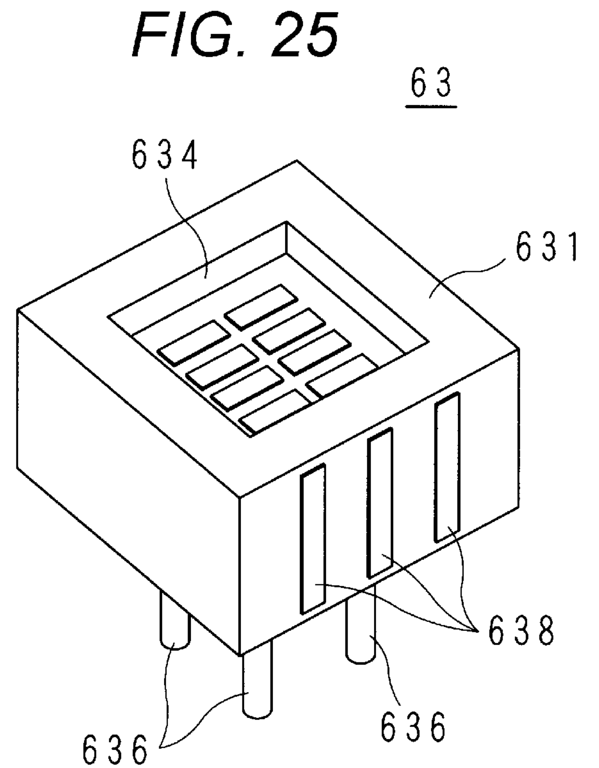
FIG. 25 is a perspective view of the light-emitting element substrate according to the second embodiment.

The present embodiment relates to an endoscope 10 that does not use the first insulating sheet 621. The descriptions of portions common to those of the first embodiment will be omitted. FIG. 23 is an exploded view of an illumination unit set 66 in the second embodiment. FIGS. 24 and 25 are perspective views of a light-emitting element substrate 63 according to the second embodiment.

The light-emitting element substrate 63 includes a connection pin 636 protruding from the second mounting surface 632 instead of the land 635 in the first embodiment. The number of the connection pins 636 may be the same as the number of the illumination cable core wires 659, or may be two like the lands 635.

As illustrated in FIG. 24, the light-emitting element substrate 63 includes an illumination frame connection portion 638 on a side surface. The illumination frame connection portion 638 is a solderable land, and is insulated from the connection pin 636 by an insulating material constituting the light-emitting element substrate 63. The side surface not having the illumination frame connection portion 638 is also insulated from a wiring material inside the light-emitting element substrate 63.

As illustrated in FIG. 25, the light-emitting element substrate 63 has an element recess 634 recessed in a substantially square shape in the first mounting surface 631. The element recess 634 is slightly larger in dimension than the light-emitting element 633. A land on which the light-emitting element 633 is mounted is disposed at the bottom of the element recess 634. The light-emitting element substrate 63 is supplied in a state where the light-emitting element 633 is mounted in the element recess 634. The number of the mounted light-emitting elements 633 may be one or more The light-emitting element substrate 63 may include a light-emitting element 633 that does not include a phosphor converting an emission wavelength, and a phosphor that is filled in the element recess 634 and covers the light-emitting element 633. The light-emitting element substrate 63 described above is manufactured by filling and curing a resin containing a phosphor after the light-emitting element 633 is mounted on the first mounting surface 631. Since the light-emitting element substrate 63 is sealed with the resin containing the phosphor, the light-emitting element substrate 63 having high durability can be achieved.

In step S507 described with reference to FIG. 20, the person in charge pre-coats the portion of the illumination cable core wires 659 from which the coating has been removed with solder, then places the portion along the connection pin 636, and performs soldering. The worker may insert the illumination cable core wires 659 into a heat shrinkable tube and cover the soldered portion with the heat shrinkable tube.

In the present embodiment, the first insulating sheet 621 is not used. That is, step S508 described with reference to FIG. 20 is unnecessary.

In step S509 described with reference to FIG. 20, the person in charge pre-coats the illumination frame connection portion 638 with solder. The person in charge inserts the light-emitting element substrate 63 inside the illumination frame 64. The person in charge applies a soldering iron to the illumination frame 64 in a state where the first mounting surface 631 is brought into contact with the abutment portion 645 to thereby melt the solder pre-coated on the illumination frame connection portion 638. After the release of the soldering iron, the temporary fixing between the illumination frame 64 and the light-emitting element substrate 63 is completed.

According to the present embodiment, the first insulating sheet 621 is not used, whereby inclination between the light-emitting element substrate 63 and the illumination frame 64 due to wrinkles or the like of the first insulating sheet 621 can be prevented. Therefore, the endoscope 10 can be provided that prevents a variation in the direction of the illumination light emitted from the light-emitting element 633.

According to the present embodiment, it is possible to easily fix the illumination frame 64 and the light-emitting element substrate 63. The worker can remove the illumination frame 64 and the light-emitting element substrate 63 as necessary by applying a soldering iron to the illumination frame 64.

According to the present embodiment, the illumination frame 64 and the light-emitting element substrate 63 are closely bonded to each other by solder having high thermal conductivity. Therefore, heat generated by the light-emitting element 633 is more easily transferred to the illumination frame 64 than in the case of using the first insulating sheet 621. As described above, an increase in temperature of the light-emitting element 633 can be further reduced as compared with the first embodiment.

Third Embodiment

The present embodiment relates to an endoscope 10 in which a part of a wall surface of an illumination frame 64 is constituted by a shield wire 655. The descriptions of portions common to those of the first embodiment will be omitted.

Figure 26:
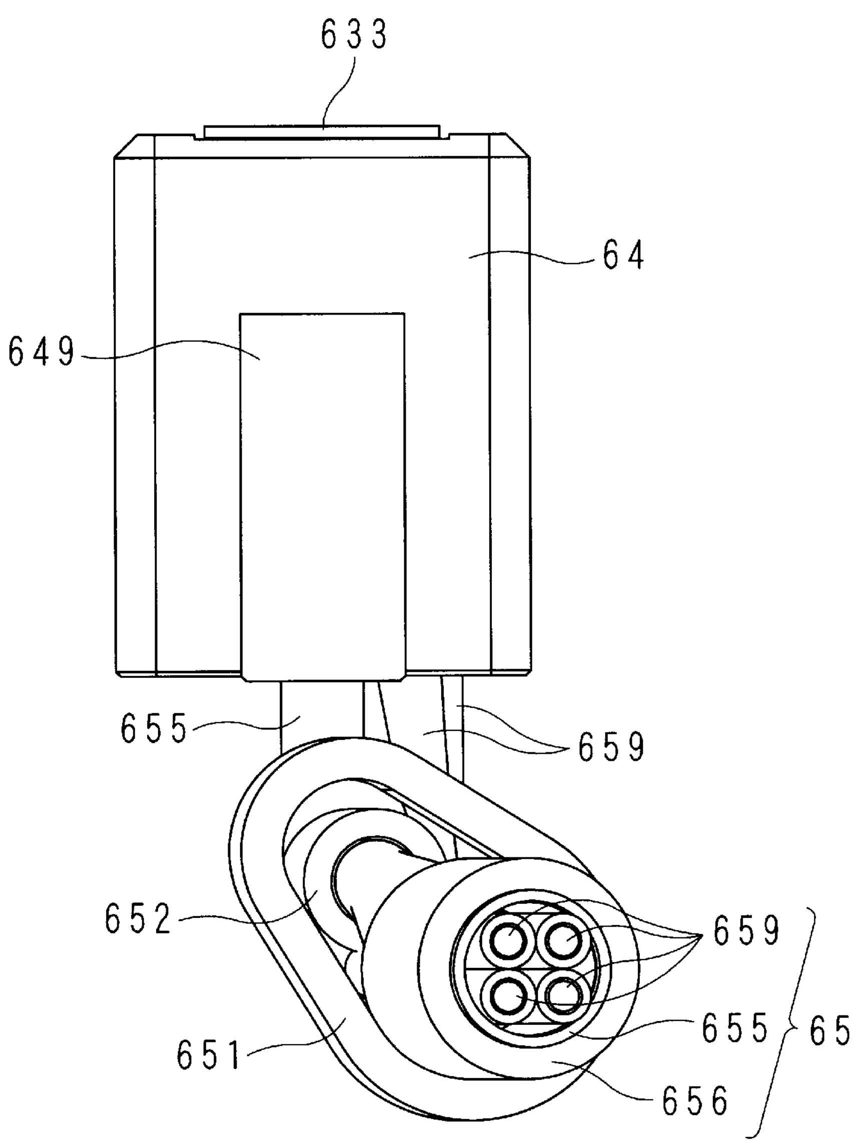
FIG. 26 is an explanatory diagram of an illumination unit set according to a third embodiment.

FIG. 26 is an explanatory diagram for describing the configuration of an illumination unit set 66 according to the third embodiment. FIG. 26 is a diagram of the illumination unit set 66 before the second insulating sheet 622 is attached as viewed in the same direction as in FIG. 11. As in FIG. 11, the cable holding tool 68 is not illustrated in FIG. 26.

Figure 27:
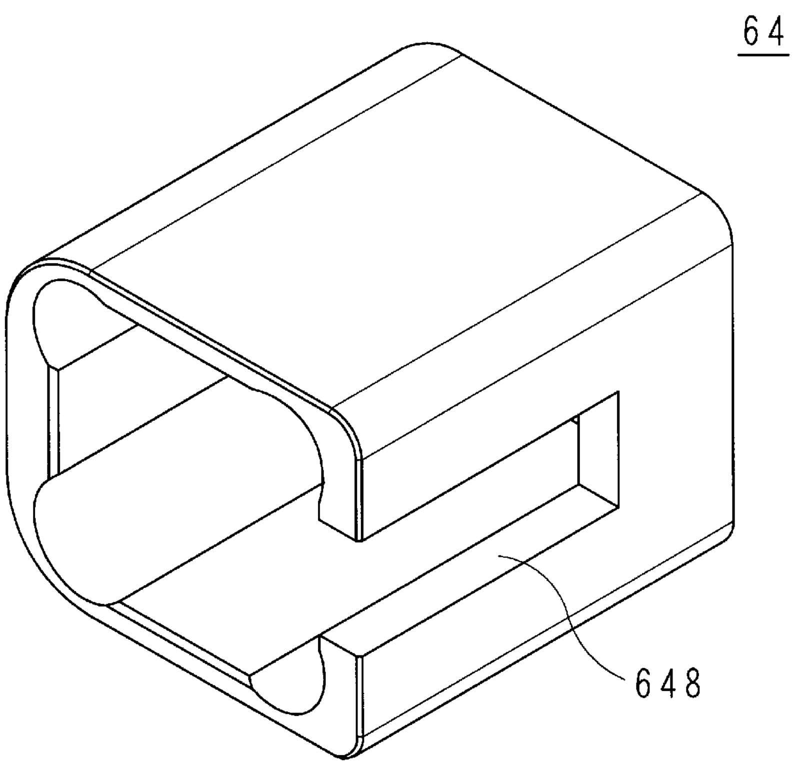
FIG. 27 is a perspective view of an illumination frame according to the third embodiment.

FIG. 27 is a perspective view of an illumination frame 64 according to the third embodiment. FIG. 27 is a perspective view as viewed in the same direction as in FIG. 13, and the abutment portion 645 described with reference to FIG. 14 is provided on the back side. The illumination frame 64 is provided with a connection groove 648 that opens to the side where the abutment portion 645 is not provided.

The connection groove 648 penetrates the cylindrical portion of the illumination frame 64 in the thickness direction, and has a substantially U shape when the illumination frame 64 is viewed from the outside. The side surface of the connection groove 648 connects the inner surface and the outer surface of the illumination frame 64.

Returning to FIG. 26, the description will be continued. In the present embodiment, a distal tip portion of the shield wire 655 is soldered to the illumination frame 64 while being inserted into the connection groove 648. The surface of the solder connection portion 649 is substantially flush with the outer surface of the illumination frame 64, and the back surface of the solder connection portion 649 is substantially flush with the inner surface of the illumination frame 64. That is, the shield wire 655 and the solder for fixing the shield wire 655 integrally fill the connection groove 648 to form a wall surface of the illumination frame 64.

Note that the outer surface of the solder connection portion 649 may be processed to be substantially flush with the outer surface of the illumination frame 64 by, for example, polishing or sanding after completion of soldering.

According to the present embodiment, even when the illumination cable 65 having a large number of shield wires 655 is used, the solder connection portion 649 can be prevented from protruding from the illumination frame 64. By using the illumination cable 65 having a large number of shield wires 655, the endoscope 10 can be provided in which the light-emitting element 633 is less susceptible to static electricity due to external noise or the like.

The technical features (constituent elements) described in the embodiments can be combined with each other to form novel technical features in combination. It should be noted that the embodiments disclosed herein are illustrative in all respects and are not restrictive. The scope of the present invention is defined not by the foregoing meanings but by the claims and is intended to include meanings equivalent to the claims and all modifications within the scope.

(Supplementary Matter 1)

An endoscope including:

an observation window fixed to a distal tip member disposed at a distal tip of an insertion portion; and an illumination unit that emits light in a viewing direction of the observation window, the illumination unit including:

a light-emitting element;

a power supply wire that supplies power to the light-emitting element, a conductor wire extending along the power supply wire, and an illumination frame that is conductive, surrounds a connection portion between the light-emitting element and the power supply wire, is insulated from the power supply wire, and is electrically connected to the conductor wire.

(Supplementary Matter 2)

The endoscope described in Supplementary matter 1, wherein the conductor wire is a shield wire surrounding a periphery of the power supply wire.

(Supplementary Matter 3)

The endoscope described in Supplementary matter 2, wherein a portion of the shield wire removed from a periphery of the power supply wire is inserted into an insulating tube.

(Supplementary Matter 4)

The endoscope described in Supplementary matter 2 or 3, wherein the shield wire surrounds four power supply wires each of which is covered by an insulating coating, each of the four power supply wires being the power supply wire.

(Supplementary Matter 5)

The endoscope described in Supplementary matter 4, wherein sets of two of the power supply wires are connected to a positive electrode and a negative electrode of the light-emitting element, respectively.

(Supplementary Matter 6)

The endoscope described in any one of Supplementary matters 1 to 5, wherein the distal tip member is conductive and is insulated from both the illumination frame and the power supply wire.

(Supplementary Matter 7)

The endoscope described in any one of Supplementary matters 1 to 6, wherein the light-emitting element is mounted on a first mounting surface of the light-emitting element substrate, and the power supply wire is mounted on a second mounting surface reverse to the first mounting surface.

(Supplementary Matter 8)

The endoscope described in Supplementary matter 7, wherein the illumination frame has a cylindrical shape surrounding a side surface of the light-emitting element substrate, the first mounting surface is disposed at an end portion of the illumination frame, and the second mounting surface is disposed inside the illumination frame.

(Supplementary Matter 9)

The endoscope described in Supplementary matter 8, wherein an insulating resin that covers a connection portion between the light-emitting element and the power supply wire is disposed inside a box defined by the second mounting surface and an inner surface of the illumination frame.

(Supplementary Matter 10)

The endoscope described in Supplementary matter 8 or 9, wherein a first insulating sheet is disposed between a side surface of the light-emitting element substrate and an inner surface of the illumination frame.

(Supplementary Matter 11)

The endoscope described in any one of Supplementary matters 8 to 10, wherein the conductor wire is connected to an outer surface of the illumination frame.

(Supplementary Matter 12)

The endoscope described in any one of Supplementary matters 8 to 11, further including a spacer fixed to an end portion of the illumination frame on a side of the second mounting surface.

(Supplementary Matter 13)

The endoscope described in Supplementary matter 12, wherein the spacer has an end portion inserted into the illumination frame.

(Supplementary Matter 14)

The endoscope described in any one of Supplementary matters 7 to 13, wherein the distal tip member includes an illumination hole that accommodates the illumination frame, and a second insulating sheet is disposed between an outer surface of the illumination frame and an inner surface of the illumination hole.

(Supplementary Matter 15)

The endoscope described in any one of Supplementary matters 7 to 14, wherein the illumination frame includes an abutment portion protruding inward from an edge at one end portion, and the light-emitting element substrate is brought into contact with the abutment portion from the inside of the illumination frame.

(Supplementary Matter 16)

The endoscope described in any one of Supplementary matters 1 to 6, wherein the illumination unit includes a light-emitting element substrate that has the light-emitting element mounted on a first mounting surface and a connection pin to which the power supply wire is connected, the connection pin protruding from a second mounting surface.

(Supplementary Matter 17)

The endoscope described in Supplementary matter 16, wherein the light-emitting element substrate has a recess in the first mounting surface, and the light-emitting element is disposed inside the recess.

(Supplementary Matter 18)

The endoscope described in any one of Supplementary matters 1 to 17, further including a connector unit connected to an endoscope processor, wherein, when the connector unit is connected to the endoscope processor, the conductor wire is connected to a GND of a patient circuit of the endoscope processor.

(Supplementary Matter 19)

The endoscope described in any one of Supplementary matters 1 to 18, wherein the distal tip member includes an illumination cable hole through which the conductor wire and the power supply wire are inserted, and a cable holding tool that is annular and is disposed between an outside of the conductor wire and an inner surface of the illumination cable hole.

(Supplementary Matter 20)

The endoscope described in Supplementary matter 19, wherein the cable holding tool includes a large-diameter portion wider than an inner diameter of the illumination cable hole and a plurality of cable holding tabs protruding to one side from the large-diameter portion, and the cable holding tabs hold the conductor wire and the power supply wire inside the illumination cable hole.

(Supplementary Matter 21)

The endoscope described in any one of Supplementary matters 1 to 20, wherein the endoscope is of a side-viewing type.

(Supplementary Matter 22)

The endoscope described in any one of Supplementary matters 1 to 20, wherein the endoscope is of a direct-viewing type.

REFERENCE SIGNS LIST

10 endoscope
18 jig
20 insertion portion
21 soft portion
22 bending section
23 distal tip portion
24 endoscope cap
25 elevator
26 bend preventing portion
27 observation window
30 distal tip member
31 illumination hole
32 illumination cable hole
38 observation cable hole
39 observation hole
40 operation unit
41 bending knob
42 channel inlet
43 forceps plug
50 connector unit
51 electrical connector
59 universal cord
60 illumination window
61 illumination cover
621 first insulating sheet
622 second insulating sheet
63 light-emitting element substrate
631 first mounting surface
632 second mounting surface
633 light-emitting element
634 element recess (recess)
635 land
636 connection pin
638 illumination frame connection portion
64 illumination frame
641 jig hole
642 thin portion
643 illumination frame groove
645 abutment portion
648 connection groove
649 solder connection portion
65 illumination cable
651 first tube (insulating tube)
652 second tube (insulating tube)
655 shield wire (conductor wire)
656 outer sheath
659 illumination cable core wire (power supply wire)
66 illumination unit set
68 cable holding tool
681 cable holding tab
682 large-diameter portion
685 outer surface protrusion
69 spacer
691 first protrusion
692 second protrusion
693 flange portion

The invention claimed is:

1. An endoscope comprising:
a distal tip member disposed at a distal tip of an insertion portion and comprising:
an observation window; and
an illumination unit comprising:
a light source that emits light in a viewing direction of the observation window;
a power supply wire that supplies power to the light source; and
an electrically-conductive illumination frame that surrounds the light source and a connection portion between the light source and the power supply wire;
a connector connected to an endoscope processor; and
a conductor wire that connects the illumination frame and the connector.

2. The endoscope according to claim 1, wherein
the light source is mounted on a first mounting surface of a light source substrate, and
the power supply wire is mounted on a second mounting surface reverse to the first mounting surface.

3. The endoscope according to claim 2, wherein
the illumination frame has a cylindrical shape surrounding a side surface of light source substrate,
the first mounting surface is disposed at an end portion of the illumination frame, and
the second mounting surface is disposed inside the illumination frame.

4. The endoscope according to claim 3, wherein
the illumination frame has, on an outer surface, a recess contiguous to an end face on a side where the second mounting surface is disposed, and
the conductor wire is connected to the recess.

5. The endoscope according to claim 3, wherein
the illumination frame has a cutout open to an end face on a side where the second mounting surface is disposed, and
the conductor wire is disposed within the cutout.

6. The endoscope according to claim 1, wherein
the illumination frame is made of metal, and
the power supply wire is insulated from the illumination frame.

7. The endoscope according to claim 6, wherein the illumination frame is made of a copper alloy.

8. The endoscope according to claim 6, wherein the illumination frame is made of brass.

9. The endoscope according to claim 1, wherein the conductor wire is a shield wire surrounding a periphery of the power supply wire.

* * * * *